United States Patent [19]

Halpin et al.

[11] Patent Number: 5,454,672

[45] Date of Patent: Oct. 3, 1995

[54] ADJUSTABLE LOAD-CARRYING FRAME FOR FULLY UTILIZING TRANSPORT ENCLOSURE SPACE

[75] Inventors: Terence Halpin, Oregon City, Oreg.; Donald Kiive, Brush Prairie, Wash.

[73] Assignee: G & G Intellectual Properties, Inc., Portland, Oreg.

[21] Appl. No.: 32,667

[22] Filed: Mar. 17, 1993

[51] Int. Cl.$^6$ .............................. B60P 1/64; B65D 88/52
[52] U.S. Cl. .................................. 410/26; 410/9; 410/24; 414/498
[58] Field of Search ................................ 410/4, 7–9, 13, 410/16, 18, 24–28, 28.1, 29.1, 30; 414/396, 399, 400, 389, 498, 572, 679; 211/175, 201

[56] References Cited

U.S. PATENT DOCUMENTS

| | | | |
|---|---|---|---|
| 362,453 | 5/1887 | Lozier | 410/26 |
| 1,282,766 | 10/1918 | Daly . | |
| 1,724,556 | 8/1929 | Blakely | 410/9 X |
| 1,869,054 | 4/1931 | Evans . | |
| 3,675,795 | 7/1972 | Dluhy | 414/498 |
| 4,124,119 | 11/1978 | Nordstrom . | |
| 4,343,401 | 8/1982 | Paulyson | 410/26 X |
| 4,343,578 | 8/1982 | Barnes | 410/151 |
| 4,668,141 | 5/1987 | Petersen | 410/16 X |
| 4,668,142 | 5/1987 | Fity et al. . | |
| 4,768,916 | 9/1988 | Gearin et al. . | |
| 4,797,049 | 1/1989 | Gearin et al. . | |
| 4,917,557 | 4/1990 | Kato et al. . | |
| 4,919,582 | 4/1990 | Bates et al. | 410/9 X |
| 4,957,407 | 9/1990 | Gearin | 414/398 X |
| 4,963,067 | 10/1990 | Gearin et al. | 410/9 X |
| 4,978,014 | 12/1990 | Humitz et al. | 211/175 |
| 5,040,938 | 8/1991 | Gearin et al. | 414/400 X |
| 5,105,951 | 4/1992 | Gearin et al. . | |
| 5,106,246 | 4/1992 | Chance | 410/26 |
| 5,286,149 | 2/1994 | Seay et al. . | |
| 5,297,908 | 3/1994 | Knott . | |
| 5,344,266 | 9/1994 | Kolb | 410/26 |

FOREIGN PATENT DOCUMENTS

| | | |
|---|---|---|
| 468349 | 1/1992 | Germany . |
| 5730310 | 6/1979 | Japan . |
| 1006496 | 10/1965 | United Kingdom . |

*Primary Examiner*—Michael S. Huppert
*Assistant Examiner*—Stephen Gordon
*Attorney, Agent, or Firm*—Chernoff, Vilhauer, McClung & Stenzel

[57] ABSTRACT

An elongate frame such as for carrying vehicles includes length-adjusting and width-adjusting assemblies that enable the frame to fully occupy differently-sized enclosures. Pivotably extensible and retractable length-adjusting sections form the length-adjusting assembly. Several length settings are achievable by selectively unlocking different combinations of sections. Overshooting of settings is avoided, despite machine-driven adjustment, by elimination of overtravel-type movement in each section. Telescopically adjustable joints, each with automatic end position latching and backup stop protection, form the width-adjusting assembly and guide the frame's sides in stable upright movement while the frame's forward end is unfolded. Minimal restrictions on vehicle size are achieved by a vehicle-supporting assembly including variable-tread wheel cradle supports, lengthwise-shifting posts which, together with the supports, establish length-adjustable vehicle-loading zones, an adapter assembly which operatively couples the width-adjusting assembly and each support to optimize tolerance for wider treads based on the width setting selected, and a toothed plate interface which operatively couples the length-adjusting assembly and each vertical post so that the frame's lengthwise vehicle-carrying capacity is based on the length-setting selected.

17 Claims, 11 Drawing Sheets

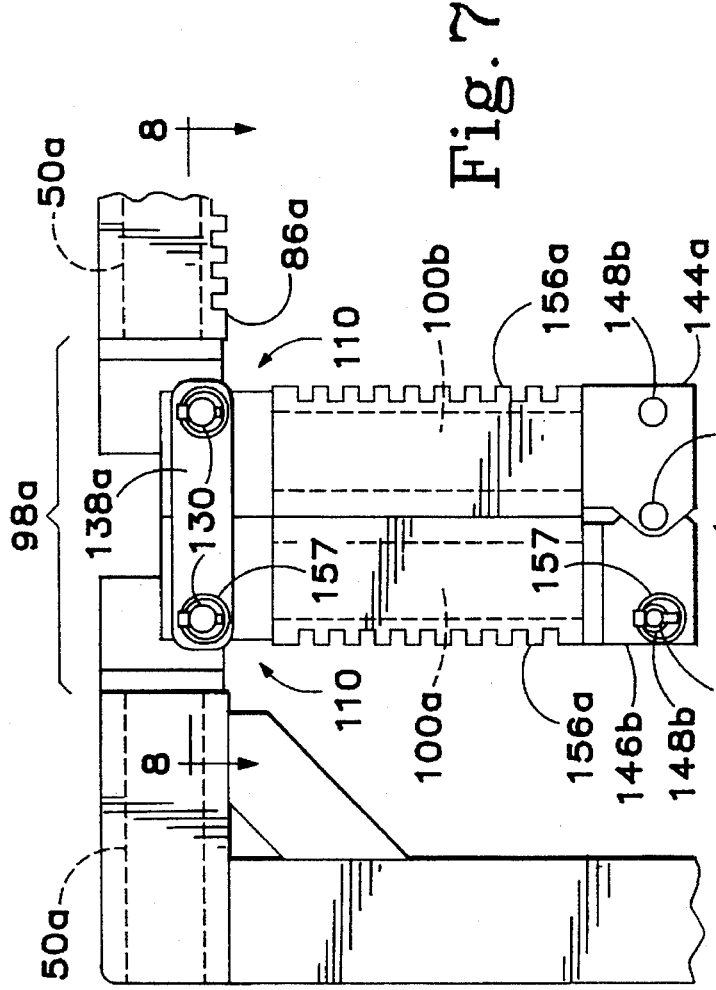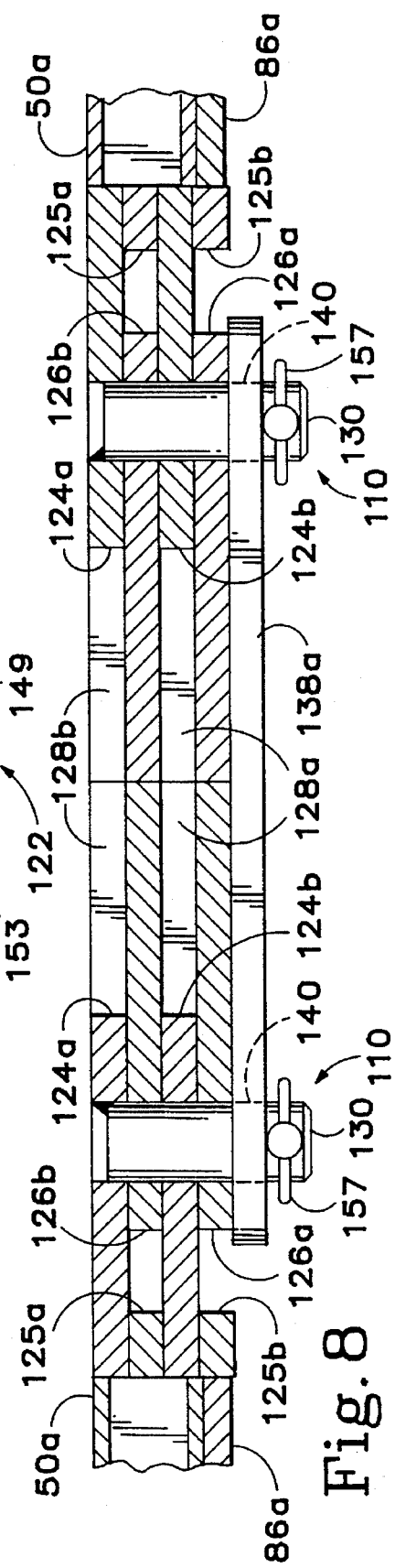

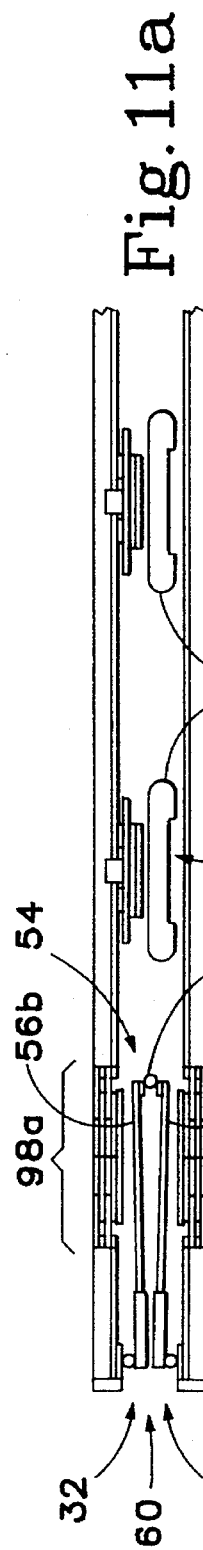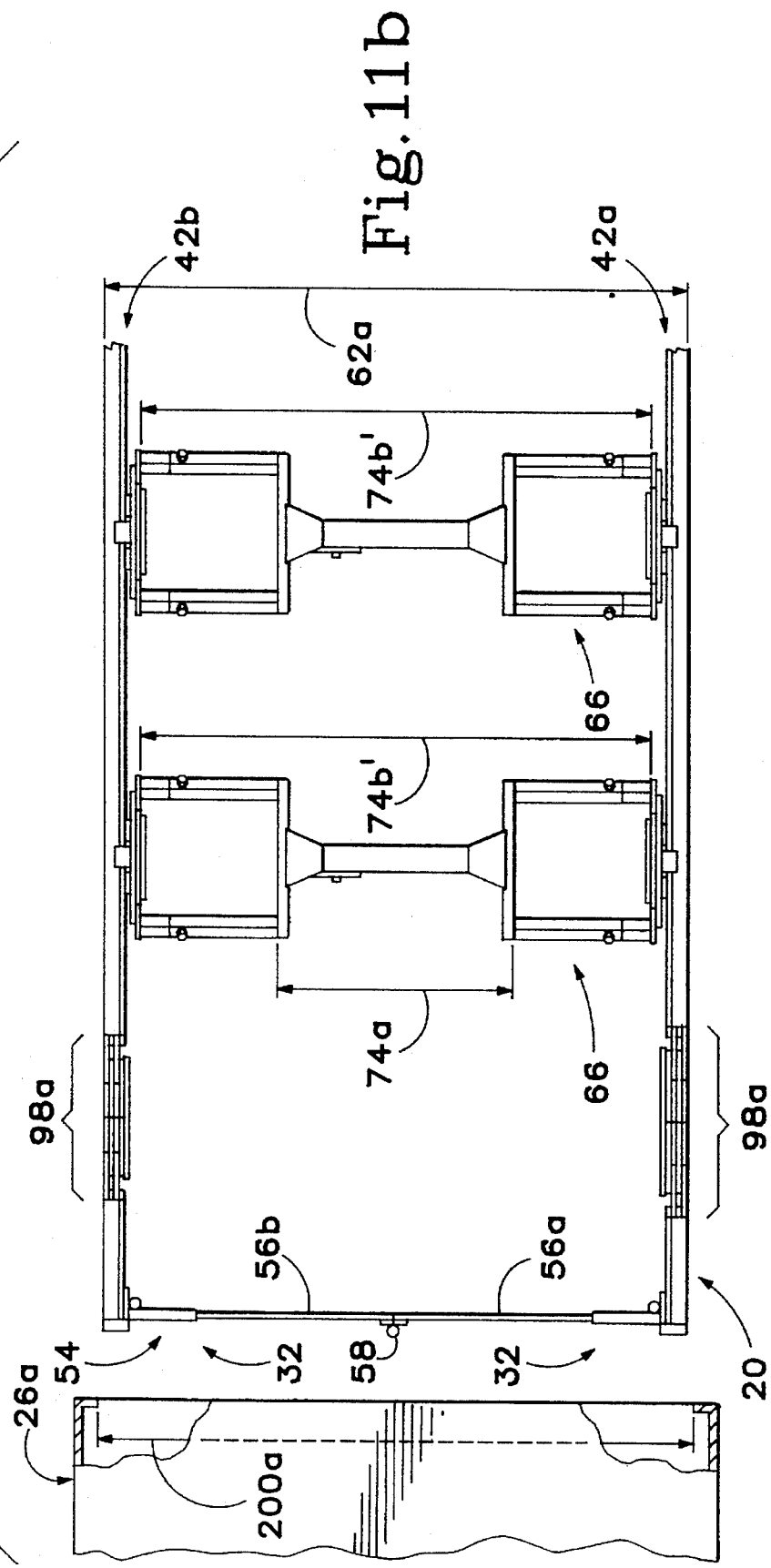

ADJUSTABLE LOAD-CARRYING FRAME FOR FULLY UTILIZING TRANSPORT ENCLOSURE SPACE

BACKGROUND OF THE INVENTION

The present invention relates to elongate load-carrying frames which, after being loaded with two or more tiers of vehicles or other loads required to be kept physically isolated from one another, are adapted for insertion into a standard cargo-carrying container or other type of enclosure for shipment. The invention further relates, in particular, to an adjustment mechanism for such frames which permits maximum utilization of the space inside each transport enclosure.

Vehicle-carrying frames that have a generally open-sided, box-like construction facilitating vehicle loading are shown in Gearin et al., U.S. Pat. Nos. 4,768,916, 4,797,049 and 5,105,951. Each of these frames has a pair of transversely spaced sides where each side includes longitudinally extending upper and lower rails rigidly held apart by longitudinally-spaced upright brace members. At their respective rearward ends, the sides are selectively held apart transversely by a detachable rigid spreader bar, while at their respective forward ends, as shown in U.S. Pat. Nos. 4,768,916 and 5,105,951, the sides are permanently connected to each other by a centrally hinged gate that selectively locks to hold the sides apart or unlocks and folds inwardly of the frame in order to collapse the sides together. This enables a number of frames to be compactly loaded in side-by-side relationship to each other for return shipment in a single cargo-carrying container.

To carry an upper and lower tier of vehicles on each of these types of frames, a vehicle-supporting assembly is used. This assembly divides the frame into discrete vehicle-loading zones, where each zone is configured to support a respective vehicle and includes forward and rearward transversely extending wheel cradles for carrying the forward and rearward wheels, respectively, of the vehicle. Each end of each wheel cradle is supported by a cradle hanger which, in turn, is vertically slidable and selectively lockable along a tension member suspended by its upper end from the upper rail of a respective side. The vertical slideability of the cradle hangers facilitates power-assisted vertical lifting of each vehicle by the hangers.

The upper ends of the respective tension members are longitudinally shiftable along the upper rails. This not only facilitates tilting of the vehicles but also permits adjustments to be made in the length and longitudinal position of each vehicle loading zone relative to the frame so that vehicles of different wheelbase can be accommodated. The freedom of movement afforded to the tension members is such that the maximum limits on the length of each vehicle loading zone, rather than being absolute, are interrelated to each other. Hence it is possible to accommodate a vehicle of almost any length and, more often than not, to make optimal utilization of the lengthwise capacity of the frame by supplying adjacent zones with vehicles that are of a complementary length. An elongate plate having numerous openings or slots spaced therealong is affixed to each upper rail to provide a plurality of pinning or locking positions for each tension member.

Frames of the type just described, despite their general versatility, are limited in the sense that they do not fully utilize the capacity of the variously-sized containers in which such frames are transported. In particular, such containers are typically 40 feet, 45 feet or 48 feet in length and 96 inches (for the 40 and 45-foot containers) or 102 inches (for the 48-foot container) in transverse width. The described type of frame, being of fixed dimension, is limited to having a length and width no larger than that which will fit within the smallest (i.e., shortest and narrowest) container. When loading a frame that is 39 feet in length (suitable for a 40-foot container), however, it is normally possible to load only three larger-length vehicles (one in the top tier and two in the bottom). If, instead, the frame were able to be 47 feet in length (suitable for a 48-foot container) it might be possible to load as many as six larger-length vehicles on the frame (three in each tier). Similarly, when loading a frame that it only about 90 inches in width (suitable for a 96-inch-wide container), if a wider-width vehicle (such as a pickup truck) is being loaded, often there are side mirrors or like items on the vehicle that scarcely clear the inner surfaces on the frame's sides This considerably slows dawn the loading process because of the extra caution that is required. If, instead, the frame were able to be about 96 inches in width (suitable for a 102-inch container), then it would be possible to load vehicles with less caution and hence more quickly and also to more fully match the frame's width to that of wider-width enclosures for less frame movement inside such enclosures during transport.

A type of vehicle-carrying transport in which tiltable vehicle supports are used in order to accommodate longer-Length vehicles is shown in Swartzwelder, U.K. Patent No. 1,006,496. The gain in vehicle length obtainable solely by the use of tiltable supports, however, is limited and comes at the expense of an increase in the combined height of the frame and vehicles. Furthermore, several classes of vehicles, such as limousines, have a larger wheelbase than the Swartzwelder type of transport can generally accommodate. This is so because the individual length of each vehicle support is fixed and such length must generally correspond, for economic reasons, to the average vehicle length in order that each transport may efficiently carry the maximum number of standard-length vehicles.

A more versatile type of adjustable vehicle carrying structure is described in Gearin, U.S. patent application Ser. No. 07/871,288, filed Apr. 20, 1992. Like its fixed-length predecessors, this length-adjustable frame provides vehicle-loading zones that not only tilt but also adjust in relative length and position so that vehicles of nearly any length may be carried on the frame. Moreover, unlike its predecessors the length of this frame can be adjusted to correspond to the various lengths of container in which the frame may be transported, and the space on the frame which is made available by such adjustment can often be fully allocated between the respective vehicle-loading zones.

Despite its many attractive features however, this particular type of length-adjustable frame does not entirely resolve the problem of maximum utilization of container space. The fixed width of this frame, for example, is Limited to that needed to fit inside the narrowest container so that problems of inefficiency when loading wider-width vehicles and of unutilized space when loading wider-width containers still remain. Moreover, the particular adjustment mechanism of this frame includes a pair of upright I-shaped inserts that each centrally occupy a respective side of the frame in interposed relationship between the respective end sections on each side. The horizontal members of each I-shaped insert serve as guides over which the upper and lower rails of each end section telescopically slide for length adjustment of the frame. This telescoping-type action involves nearly four feet of overlapping section per end, however, making the respective sections susceptible to sticking or jamming. In addition, the sizes of the lower rails must be increased so that they will provide adequate bearing surfaces for the extra loading involved. This, in turn, increases overall weight and, indeed, may add almost 1,000 pounds to the weight of each frame. At this level of weight, no more than two or three collapsed frames can be loaded into a single container for return shipment before recommended weight limits are reached, which again results in unutilized container space. Finally, adjusting the end sections to enable such sections to be interlocked with the I-shaped insert requires a considerable amount of tedious back-and-forth movement of the end sections in order for certain pin-receiving holes located on the end sections to reach proper alignment with other pin-receiving holes that are located on the insert. This tendency toward overshoot and undershoot in the locking procedure makes automation of the procedure expensive and impractical, so that the benefits in speed and labor savings which typically would result from automation cannot be realized. In instances of extreme operator carelessness, moreover, the end sections could actually pull apart from the insert and present a falling hazard.

With respect to width-adjustability, Nordstrom U.S. Pat. No. 4,124,119 shows a floor-mounted vehicle-carrying frame having upper and lower wheel-supporting rails and tiltable sides where the angle of tilt is set based on the difference in width between the upper and lower groups of vehicles that are to be carried on the frame. Before they are locked into place at a selected tilt, however, the sides are not self-supporting and therefore present a falling hazard unless they are held in place such as by an external clamping assembly. Moreover, within each upper or lower group, the vehicles are restricted to being of uniform width. Perhaps even more significant, the Nordstrom frame is assembled in order to fit the width requirements of particular vehicles so that each time a new group of vehicles is to be carried on the frame, unless the width of this new group substantially matches the width of the old group partial reassembly of the Nordstrom frame is required. This general strategy of sizing a frame or other vehicle-carrying structure to uniquely fit the sizes of specific vehicles is not unique to Nordstrom but also appears in older references such as Evans U.S. Pat. No. 1,869,054, which shows a wall-mounted pair of "spider-leg" supports where the head of each spider can be adjustably set at different distances from the wall depending on the width of the specific vehicle to be carried by the supports.

From the standpoint of accommodating variance in vehicle width, a more versatile type of system is shown in Fity et al. U.S. Pat. No. 4,668,142 and in the previously cited copending Gearin application. In each of these references an elongate wheel cradle support is described which extends transversely between the sides of the vehicle-carrying structure and which supports a transverse pair of wheels of a vehicle when the transverse wheel spacing ranges between predetermined outer and inner width dimensions that characterize the wheel cradle support. Unlike the Nordstrom-type and Evans-type systems, the Fity and Gearin structures may be reloaded with new vehicles without close attention paid to the precise width of each new vehicle or how that width compares to those of earlier-carried vehicles. Neither the Fity system nor the Gearin system, however, provides the capability to expand the width range of each wheel cradle support beyond its original limits, nor satisfies the competing needs for longer-length wheel cradles to support wider-width vehicles and shorter-length wheel cradles to fit within narrower-width containers.

Accordingly, an object of the present invention is to provide a load-carrying frame for supporting physically isolated loads, such as vehicles, that has an adjustment mechanism which will enable the frame to fit snugly in different transport enclosures having different internal dimensions and which, at the same time, will permit maximum utilization of the space inside each transport enclosure.

A related object of the present invention is to provide an adjustment mechanism of the above type that is relatively lightweight in relation to the total weight of the frame, thereby permitting a maximum number of such frames, each one collapsed for return shipment, to be transported Safely in a transport enclosure.

A further object of the present invention is to provide an adjustment mechanism of the above type which prevents inadvertent detachment of the adjustable frame sections during the adjustment procedure.

A further object of the present invention is to provide an adjustment mechanism for expanding or contracting the length of a vehicle-carrying frame that is unlikely to jam during normal use.

Another object of the present invention is to provide an adjustment mechanism for expanding or contracting the length of a vehicle-carrying frame that will conveniently lock into place at different dimensional settings without overshoot or undershoot.

A related object of the present invention is to provide an adjustment mechanism of the above type that can be operated by power-driven equipment.

Yet another object of the present invention is to provide an adjustment mechanism that enables adjustment of the frame's width for improved efficiency during vehicle loading and for fuller utilization of the enclosure's internal space.

SUMMARY OF THE PRESENT INVENTION

To achieve the aforementioned objects, in accordance with a first aspect of the present invention an elongate load-carrying frame is provided including upright sides and having, on each side, a forward end and a rearward end that are longitudinally separated from one another. Carried between the ends of each side is a pivotably extensible and retractable length-adjusting assembly which is adapted to enable longitudinal adjustment of the forward end relative to the rearward end in order to vary the separation therebetween and thereby vary the length of each side. This pivotable length-adjusting assembly, in contrast to a telescopically-slidable length-adjusting assembly, is not likely to jam during normal use and, having no need for extra-wide bearing surfaces, can be made of lightweight construction. A full load of such frames, accordingly, can be safely transported in their collapsed state inside a standard transport container.

Pursuant to a further aspect of the present invention, a load-carrying frame is provided where the length-adjusting assembly prevents the forward and rearward ends of the sides from detaching in a manner that might be injurious to the frame operator while the separation between the ends is being adjusted.

In a still further aspect of the invention, the length-adjusting assembly is moveable alternately between an extended position and a retracted position and further includes an overtravel limit mechanism for automatically preventing movement beyond the extended position. In this manner, the length-adjusting assembly can quickly be locked into place at an extended length setting without time being wasted in overshooting or undershooting the setting. Preferably, a similar overtravel limit mechanism is provided with respect to the retracted position. Furthermore, this arrangement facilitates automated operation of the length-adjusting assembly by power-driven equipment, which equipment might otherwise be unavailable for this use due to the lack of precision of such equipment in compensating for overshoot or undershoot.

In accordance with a still further aspect of the present invention, a load-carrying frame of the general type above is provided where the length-adjusting assembly is divided between respective forward and rearward length-adjusting sections which together separate the forward end, a center section, and the rearward end of each side of the frame. These length-adjusting sections, each with its own over-travel limit mechanism, enable quick, independently lockable adjustment of the respective longitudinal relationships between the center section and the forward and rearward ends. Preferably one section provides greater extensibility than the other for maximum variability of the length adjustment.

In accordance with another aspect of the present invention, an elongate load-carrying frame is provided having a pair of transversely spaced upright sides with each side including a forward and rearward end. The frame further includes an end assembly extending in generally perpendicular relationship to the sides between the respective forward ends of the sides, the end assembly having a width-adjusting assembly that is adapted to enable selective adjustment of the transverse spacing between the sides while maintaining the perpendicular relationship of the end assembly to the sides. Moreover, the width-adjusting assembly includes guiding structure adapted to guide the movement of the sides during adjustment of the transverse spacing so that the sides are maintained in substantially upright position throughout the movement. This arrangement provides a frame on which vehicles can be loaded with maximum efficiency and which is able to fully occupy, and hence fully utilize, the side-to-side extent of containers and other enclosures that have different side-to-side widths. Furthermore, the sides of the frame are movably stable and do not pose a falling hazard nor do they require for their support the aid of a team of operators or elaborate clamping equipment.

In accordance with a further aspect of the present invention, an elongate vehicle-carrying frame is provided having transversely-spaced upright sides and a width-adjusting assembly to selectively adjust the spacing between the sides. The vehicle-carrying frame further includes an elongate transverse wheel cradle support, which is adapted to receive a transverse pair of wheels of a vehicle when the spacing between the wheels falls within a predetermined range, connecting members for connecting such wheel cradle support perpendicularly to the sides of the frame, and an adapter to compensate when an adjustment is made in the transverse spacing between the sides so that the wheel cradle support will continue to connect to the sides despite such adjustment. This particular combination, therefore not only incorporates the type of wheel cradle support that can flexibly accommodate vehicles of different width but operably merges this feature with a frame having width-adjustable sides to permit snug fitting of the frame inside transport enclosures of different widths.

In accordance with another aspect of the present invention, a method of adjusting an elongate vehicle-carrying frame is provided. This method includes the steps of providing an elongate vehicle-carrying frame, of adjusting the size of the frame in a direction transverse of the frame based on criteria independent of the relative widths of the respective vehicles that are to be carried on the frame, of providing a vehicle-supporting assembly, and of dividing the frame into a number of vehicle-loading zones by means of the vehicle-supporting assembly where each zone has an outer width dimension limit in a direction transverse of the frame and is configured to physically support a vehicle when the width of the vehicle is within the outer width dimension limit. In contrast, then, to conventional methods, the width of the frame is not adjusted based on the widths of the particular vehicles that are to be carried on the frame but, instead, the frame width is adjusted based on more general criteria. Any variability in the widths of the particular vehicles is resolved by the vehicle-loading zones themselves (through the vehicle-supporting assembly), and without tedious vehicle-specific adjustments being needed.

The foregoing and other objectives, features and advantages of the invention will be more readily understood upon consideration of the following detailed description of the invention, taken in conjunction with the accompanying drawings.

BRIEF DESCRIPTION OF THE DRAWINGS

FIG. 7 is a fragmentary side elevational view as seen from inside the frame of FIG. 1 showing the upper part of the forward length-adjusting section taken after the section has been locked in its retracted position by a removable locking bar.

FIG. 8 is a partial sectional view taken along lines 8—8 in FIG. 7.

FIG. 11a is a fragmentary plan view of the forward portion of the frame of FIG. 1 taken after the forward end assembly and the vehicle-supporting assembly have been collapsed in order to prepare the frame for reshipment with other collapsed frames within a single enclosure.

FIG. 11b is a fragmentary plan view similar to FIG. 11a but taken after the frame has been opened and set to its narrowest-width setting for insertion into a narrower-width enclosure also shown in fragmentary view with its ceiling partially removed to reveal its interior sidewalls.

FIG. 12 is a fragmentary perspective view showing details of an alternative spring-loaded movement-limiting control that can be used in place of the exemplary control shown in FIGS. 9–9a.

DETAILED DESCRIPTION OF THE PREFERRED EMBODIMENT

Figure 1:
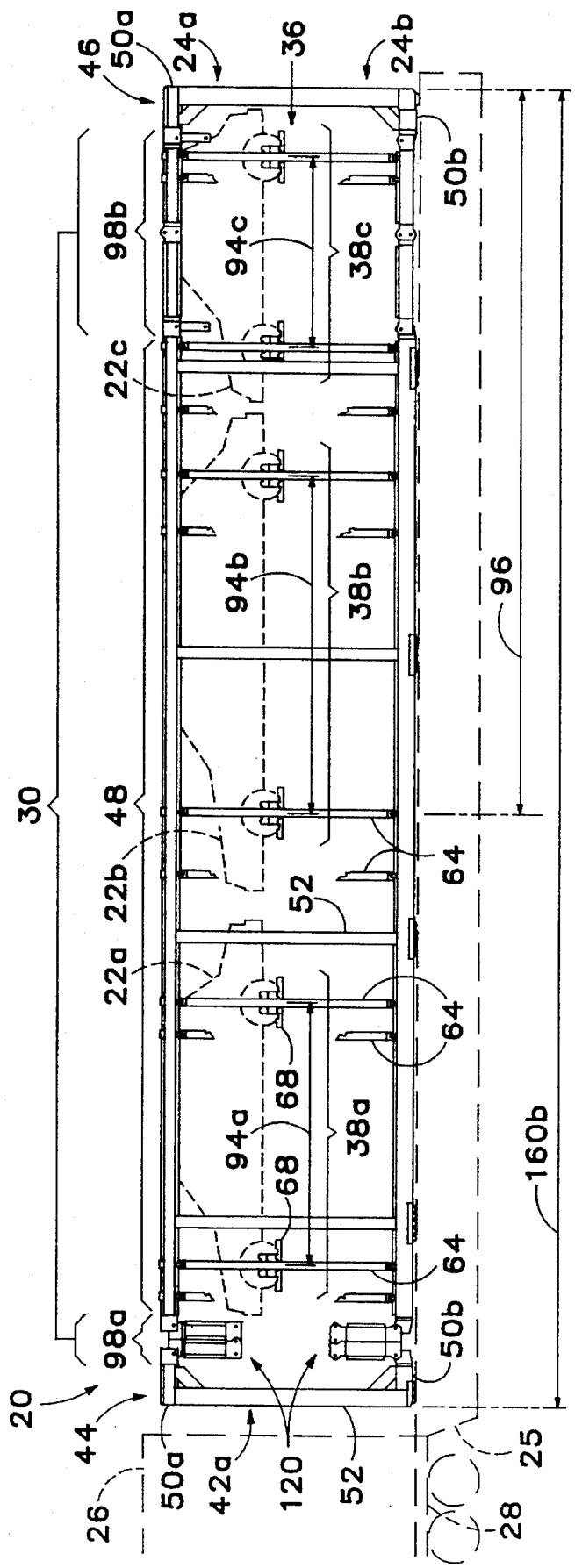
FIG. 1 is a side elevational view of an exemplary adjustable frame constructed in accordance with the present invention which has been set to its intermediate length setting for supporting, as indicated in dashed lines, a plurality of vehicles of which only those in the upper tier are shown for clarity of illustration. Alternate ones of the vertical posts on the frame are shown in fragmentary view to indicate the supporting structure for the lower tier of vehicles. A platform for supporting the frame and an enclosure into which the frame can be loaded from the platform are indicated in dashed-line view.
Figure 4:
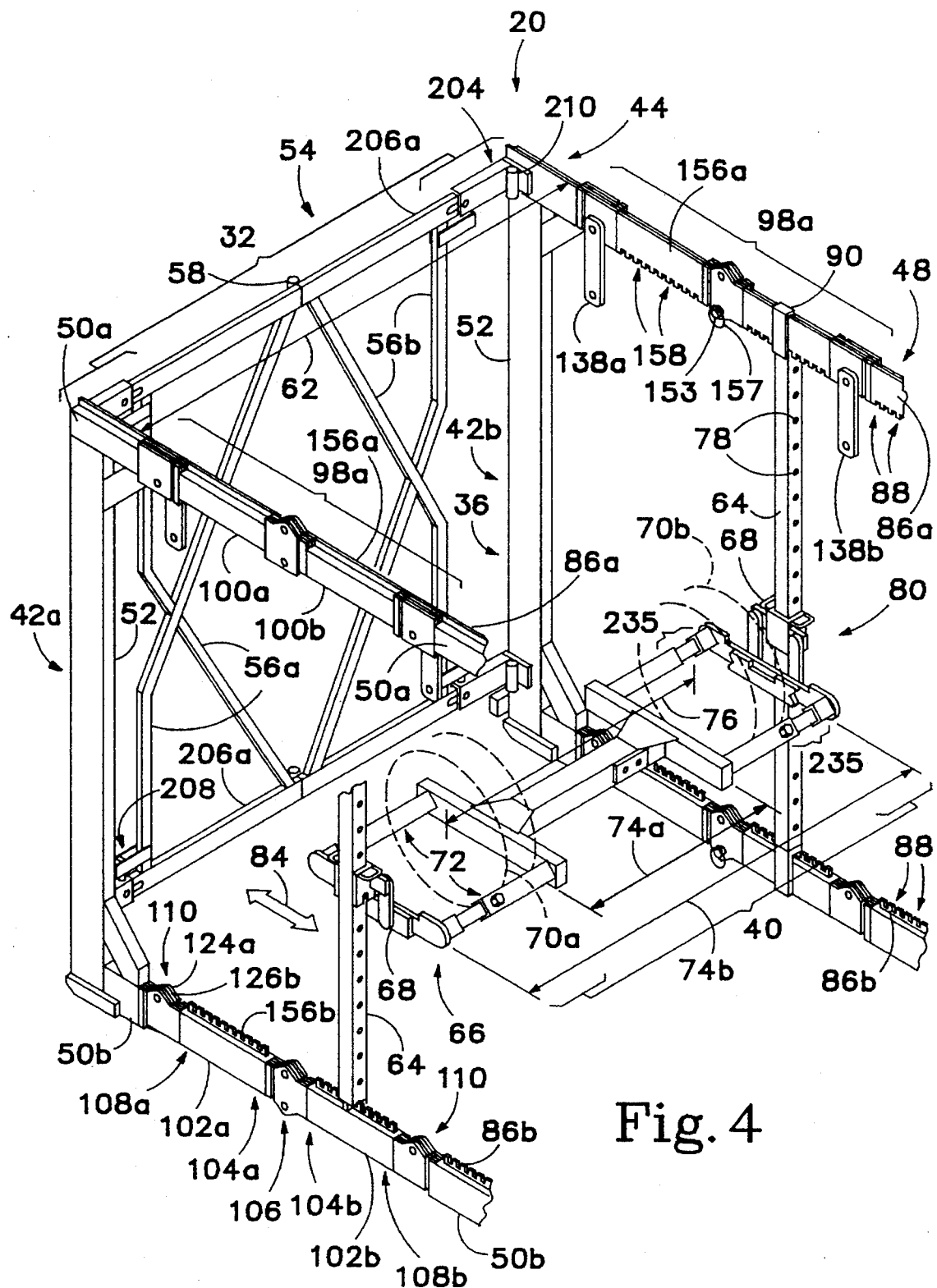
FIG. 4 is a perspective view of the forward end of the frame of FIG. 1 showing the width-adjusting assembly, the vehicle-supporting assembly in support of a transverse pair of vehicle wheels indicated in dashed-line view, and the adapter assembly used to adjust the vehicle-supporting assembly to compensate for adjustments in the width-adjusting assembly.

FIG. 1 shows an exemplary adjustable frame 20 constructed in accordance with the present invention. The frame is adapted for carrying a plurality of vehicles (e.g., 22a, b, c) on an upper tier 24a and lower tier 24b of the frame (only the vehicles on the upper tier are shown for clarity of illustration). An external platform 25 optionally supports the frame so that after the frame is loaded with respective vehicles, the frame can be conveniently wheeled into an enclosure 26 of the type that is carried, for example, on the flatbed 28 of a trailer rig. As described in the Background section, this type of enclosure is typically available in three standard sizes, and the frame 20 includes both a length-adjusting assembly 30 and a width-adjusting assembly 32 (FIG. 4) to enable adjustment of the size of the frame so as to permit full utilization of the space inside whichever enclosure is available. Also, included on the frame is a vehicle-supporting assembly 36 which divides each tier of the frame into individual vehicle-loading zones (e.g., 38a–c) where each zone is able to physically support a respective vehicle. Referring to FIG. 4, this vehicle-supporting assembly includes an adapter assembly 40 which permits adjustment of the vehicle-supporting assembly 36 to compensate for any size adjustments made to the overall frame. Following a preliminary description of the basic aspects of the exemplary frame, descriptions of the length-adjusting assembly 30, the width-adjusting assembly 32, the adapter assembly section 40 and a preferred method of adjusting the frame are provided below under separate subheadings.

Basic Aspects of the Preferred Frame Embodiment

Like the Gearin-type frames which are described in the Background section, the adjustable frame 20 has a generally open-sided, box-like construction. Referring to FIGS. 1 and 4 together, the frame includes a pair of transversely,spaced elongate upright sides 42a, b which, in combination with the vehicle supporting assembly 36, are capable of supporting one or more wheeled vehicles (e.g., 22a, b, c). Each side includes a forward end 44, rearward end 46, and a center section 48 that are longitudinally separated from one another. Each end or section further includes a longitudinally extending upper and lower rail 50a and 50b, respectively, that are held rigidly apart by upright brace members 52. The individual rails and brace members which form each side are made of generally rectangular-sided hollow steel tubing and are connected together by conventional welding methods. As indicated in FIGS. 1 and 4 together, each side 42a, b includes a corresponding, pivotably extensible and retractable length-adjusting assembly 30 which is constructed in accordance with the present invention as further described hereinbelow under separate subheading.

Figure 11C:
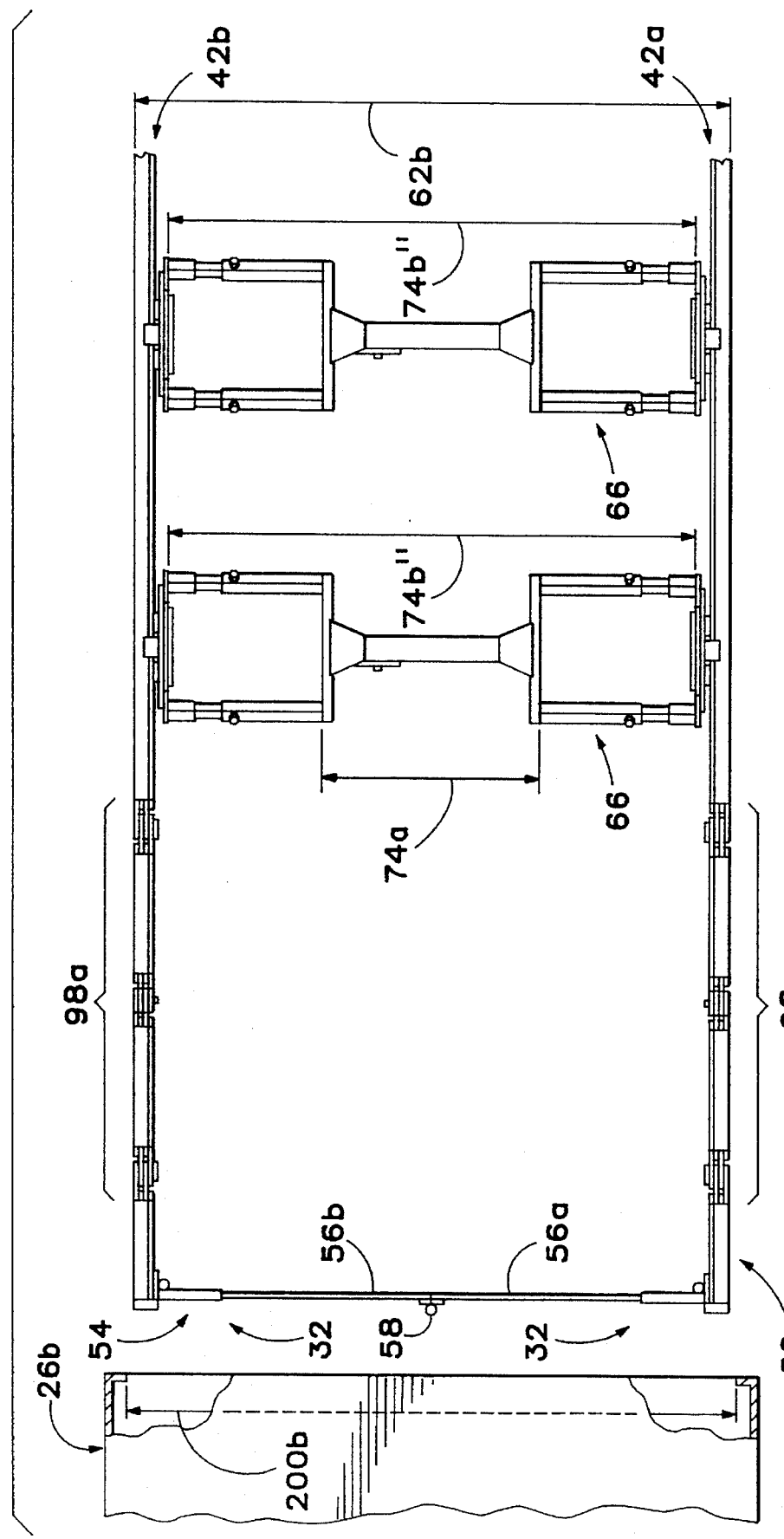
FIGS. 11c is similar to FIG. 11b but the sides and vehicle-supporting assembly of the frame have been readjusted to their widest-width setting for insertion into a wider-width enclosure also shown in fragmentary view.

Referring to FIG. 4, like the Gearin frames, the adjustable frame 20 includes an interconnecting end assembly 54 that extends in generally perpendicular relationship between the respective forward ends 44 of the two sides 42a, b to support these sides in upright position. Referring also to FIG. 11a, the end assembly includes a pair of cross-braced panels 56a, b that are connected together by a central hinge assembly 58 in order that the end assembly may fold inwardly of the frame from its operative position in perpendicular relationship to the sides to a collapsed position 60 extending generally parallel to the sides. The interconnecting end assembly further includes a width-adjusting assembly 32 constructed in accordance with the present invention as further described hereinbelow under separate subheading. This assembly 32 enables selective adjustment of the transverse spacing 62 between the sides while maintaining, as shown in FIGS. 11b–c, the perpendicular relationship between the end assembly and the sides so that no diminishment in lengthwise frame capacity occurs. The rearward ends 46 of the respective sides are conventionally held apart by a rigid spreader bar (not shown) that can be removed when movement of the end assembly 54 to its collapsed position is desired.

Referring to FIGS. 1 and 4 together, in order to support a plurality of vehicles (e.g., 22a, b, c), the adjustable frame 20 includes a vehicle-supporting assembly 36. This vehicle-supporting assembly, like those of the Gearin frames, includes vertically-suspended tension members or posts 64, elongate wheel cradle supports 66, and connectors or hangers 68. The hangers serve to connect the opposite ends of each wheel cradle support 66 to a corresponding pair of the vertical posts 64 so that the wheel cradle support can receive the transverse pair of wheels 70ia, b of a selected vehicle. As shown, each separate vehicle is supported by a vehicle-loading zone formed by two wheel cradle supports, four hangers, and four posts..

The vehicle-supporting assembly 36 further includes an adapter assembly 40 (FIG. 4) that preferably includes a pair of adjustable portions 235 located on each end of each wheel cradle support. This adapter assembly permits adjustments in the length of each wheel cradle support to compensate for adjustments in the transverse spacing 62 between the sides 42a, b of the frame. The adapter assembly is constructed in accordance with the present invention as further described hereinbelow under Separate subheading.

Referring to FIG. 4, adjacent its respective ends, each wheel cradle support 66 includes a pair of parallel members 72. These parallel members ensure that each wheel cradle support, and hence each vehicle-loading zone, has both an inner width dimension limit 74a and an outer width dimension limit 74b (if the parallel members at one end run integrally together with the parallel members at the other end, the inner width dimension limit is set to zero.) Accordingly, the wheel cradle support is able to carry the wheels of a particular vehicle without regard to the specific transverse wheel spacing 76 of that vehicle provided the vehicle's wheel spacing falls within a predetermined range of wheel spacings conforming to the inner and outer width dimension limits 74a and 74b. As a practical matter, these inner and outer width dimensions are sufficient to accommodate any vehicle of normal wheel spacing even, for example, when the adapter assembly 40 is set for minimum wheel cradle support length, although special conditions, such as balloon-type tires on exceptionally wide vehicles, may require that the wheel cradle support be set for maximum length. For convenience's sake, the transverse wheel spacing 76 of a vehicle will hereafter also be referred to as its "width" with the understanding that this is only a rough understated measure of a vehicle's actual width due to side mirrors, curb indicators and other such accessories. Similarly, a vehicle's axle-to-axle spacing will hereafter also be referred to as its "length" with the understanding that this rough understated measure does not account, for example, for trunk and hood length.

Referring to FIG. 4, a plurality of vertically-spaced holes 78 are formed in each post so that a pin (not shown) can be inserted at selected vertical positions on the post in order to support a hanger 68 at each of those positions. Preferably, the end of each wheel cradle support 66 is pivotably movable on each hanger so that in preparation for collapsing the end assembly 54, the wheel cradle support can be moved from its supporting position 80 shown in FIG. 4 to a convenient storage position 82 shown in FIG. 11a. Preferably, also, each wheel cradle support 66 is slidable at least some limited distance on its corresponding hangers in a direction 84 lengthwise of the frame so that when a particular vehicle is being tilted on its corresponding pair of wheel cradle supports, these supports can move closer to each other without the need to unlock and move the corresponding vertical posts 64 from their respective positions. Apart from this limited sliding movement, however, the lengthwise position of each wheel cradle support 66 relative to the frame is primarily controlled by adjustments in the lengthwise position of each corresponding pair of vertical posts 64.

To facilitate adjustment of the lengthwise position of each vertical post 64, a broad-sided, upper-toothed plate 86a is butt-welded to the broad inside edge of each upper rail 50a that extends along a center section 48 of the frame. Similarly, a narrow-sided, lower-toothed plate 86b is edge-welded to the narrow inside edge of each facing lower rail 50b. These upper and lower plates have respective pairs of adjacent teeth which are vertically aligned with each other to define a plurality of longitudinally spaced primary locking positions 88. Each post 64 includes an upper hooked portion 90 that enables the post to be suspended from the upper plates. Proximate its respective ends, each post further includes an upper and lower hub 92a and 92b (FIG. 3) that are so arranged that when the post is outwardly shifted away from the frame interior, these hubs are able to slide lockingly between the teeth on the upper and lower plates into a selected one of the primary locking positions. Alternatively, when the post is shifted toward the frame's interior, its hubs draw back away from the teeth so as to enable the hooked portion of the post to slide along the upper plate for shifting movement of the post in a direction lengthwise of the frame. This capability for lengthwise shifting adjustment of each post, and hence each wheel cradle support 66, ensures that each vehicle-loading zone (e.g., 38a, b, c) not only has an inner and outer width dimension limit 74a and 74b, respectively, but also an adjustable length dimension (e.g., 94a, b, c) To keep the respective posts 64 in their selected primary locking positions 88, each hub has an end portion protruding beyond the teeth so that a pin (not shown) inserted through a hole formed in this end portion keeps each hub in place.

Like corresponding assemblies used on the Gearin frames which are described in the Background section, the vehicle-supporting assembly 36 just described is able to carry vehicles that vary considerably in length. In the particular loading pattern depicted in FIG. 1, for example, the vehicle-supporting assembly divides the upper tier 24a of the frame into left, center and right vehicle loading zones 38a, b, and c, respectively. As shown, there is a maximum limit for the length dimension 94b of the center zone that can only be determined after the maximum limits for the length dimensions 94a, c of the other zones are known. In other words, all that is required in order to enlarge the maximum limit for the length dimension 94b of the center zone (e.g., to support a very long vehicle such as a limousine 22b) is to reduce, for example, the maximum limit for the length dimension 94c of the right zone preferably while maintaining the right zone limit above that needed to support a subcompact 22c). The length dimensions of the respective zones 38a, b, and c are not restricted, then, in the sense of being tied to any absolute limit but rather they have flexible maximum limits that are interrelated to each other.

The maximum lengthwise limits of zones in adjacent position to each other are not completely arbitrary, however, but instead sum together to a value uniquely associated with the length of the frame or frame portion that such zones occupy. Thus, comparing the zones 38b and 38c in FIG. 1 to the zones 38f and 38g in FIG. 2, even though their corresponding maximum lengthwise limits are different, because these zones occupy frame portions of equal length (i.e., 96) the summed value of their maximum lengthwise limits are about the same (i.e., 94b+94c about equals 94f+94g). As this comparison shows, the summed value of the lengthwise limits serves as a useful measure of the lengthwise vehicle-carrying capacity of a frame. While the length-adjustable Gearin frame described in U.S. patent application Ser. No. 07/871,288 desirably includes a mechanism for increasing this summed value, as noted in the Background section, there are difficulties arising from its design which have prevented its widespread acceptance. As described under the subheading immediately following, the length-adjusting assembly 30 of the adjustable frame 20 overcomes these difficulties while retaining a mechanism for increasing the lengthwise capacity of the frame.

The Exemplary Length-Adjusting Assembly

Figure 2:
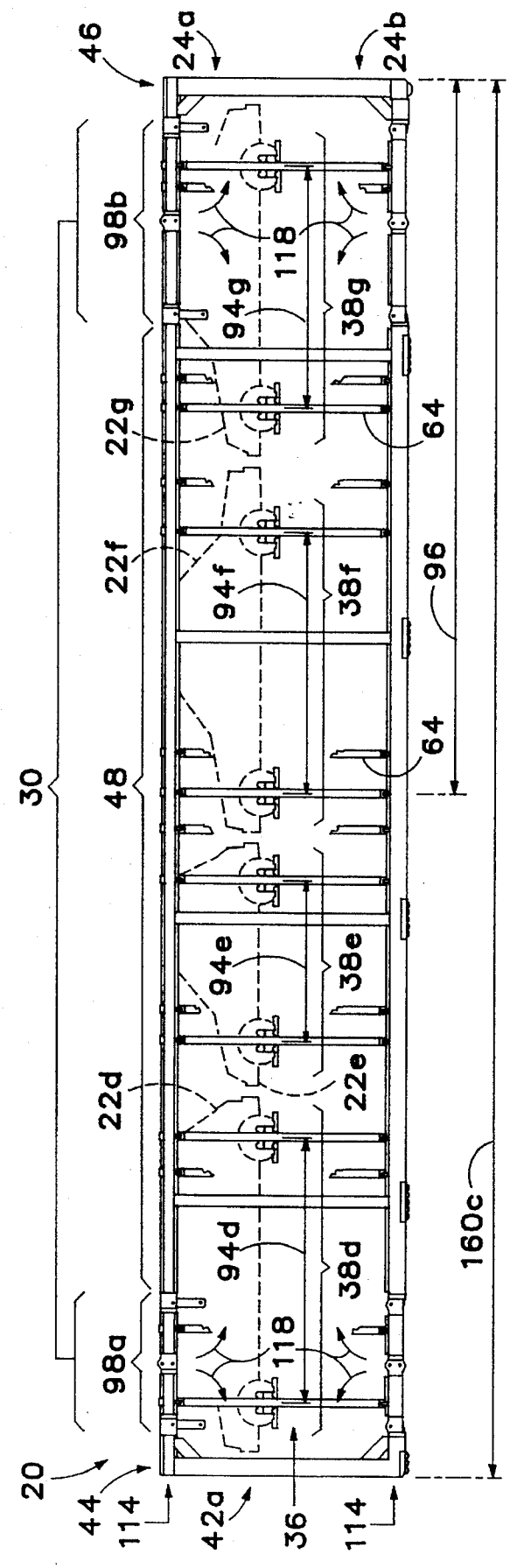
FIG. 2 is similar to FIG. 1 except that the frame has been set to its longest-length setting, the vehicle-loading pattern has been modified accordingly, and the frame is shown apart from any external platform or enclosure.
Figure 3:
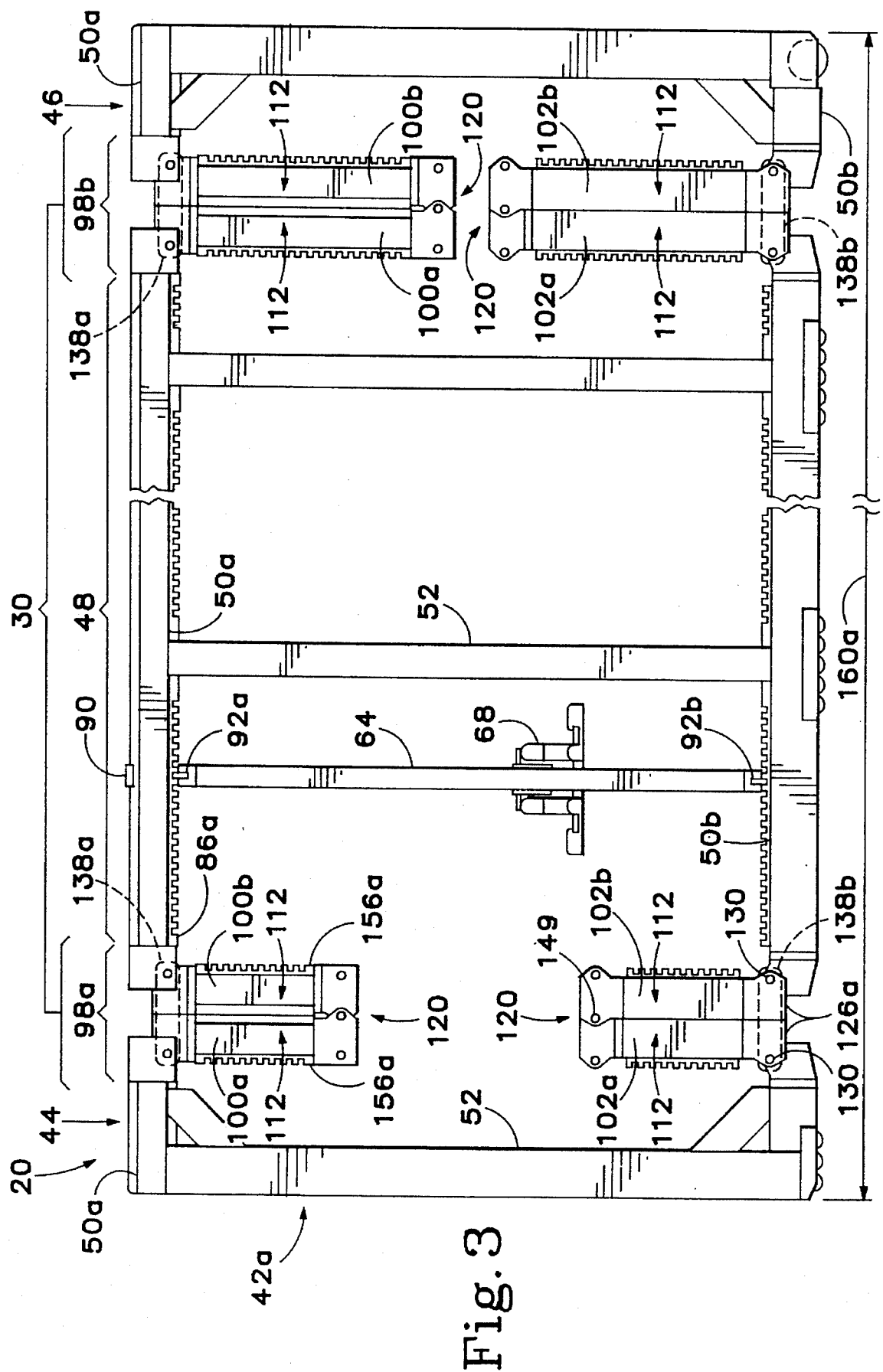
FIG. 3 is a fragmentary side elevational view of the frame of FIG. 1 set to its shortest length and enlarged in scale to clearly show the basic construction of the length-adjusting assembly of the frame.

Referring to FIG. 3, between the forward end 44 and the rearward end 46 of each of its respective sides 42a, b the frame 20 includes a length-adjusting assembly 30. As shown, this length-adjusting assembly includes a forward and rearward length-adjusting section 98a and 98b, respectively. The length-adjusting assembly is adapted to enable longitudinal adjustment of the position of the forward end relative to the rearward end in order to vary the separation therebetween and thereby vary the length of each respective side of the frame. In particular, comparing FIGS. 2 and 3, it will be recognized that each length-adjusting section 98a or 98b enables adjustment of the longitudinal separation between the center section 48 of each side and the respective end 44 or 46 corresponding to that length-adjusting section.

As indicated in FIG. 4, each length-adjusting section such as 98a includes an upper and lower pair of elongate linking members 100a–b and 102a–b, respectively. These linking members are formed of rectangular-sided hollow steel tubing which, depending on whether they are part of the Upper or lower pair, generally conform in cross-section to the upper and lower rails 50a and 50b. The linking members of each pair have respective first end portions 104a, b that are connected together via a center hinge assembly 106 and further have respective second end portions 108a, b that are connected, directly or indirectly, to the forward and rearward ends 44 and 46 via a corresponding pair of end hinge assemblies 110.

Figure 6:
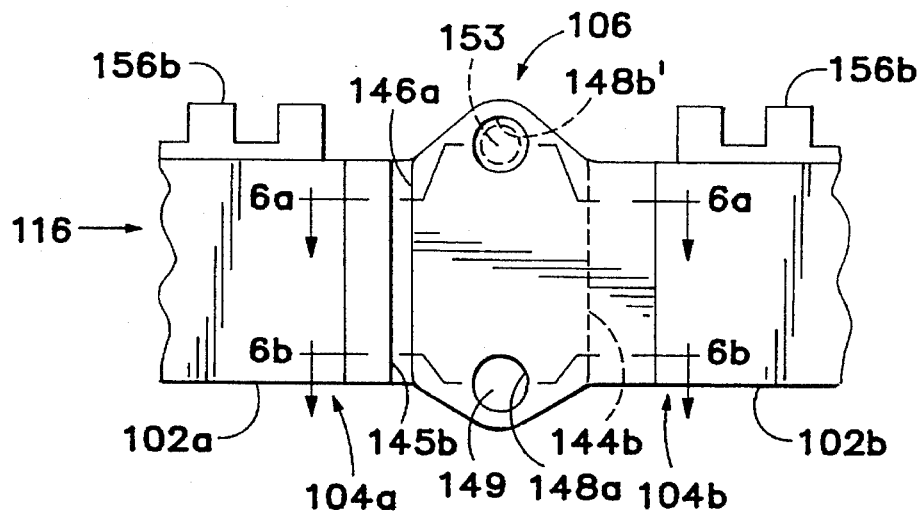
FIG. 6 is a fragmentary side elevational view of a center hinge assembly of the forward length-adjusting section of the frame shown in FIG. 1 taken after the section has been moved to its extended position and a removable locking pin has been applied to hold this position.

Each length-adjusting section 98a and 98b pivotably extends and retracts due to the hinged connection of its respective linking members. For example, when the linking members 100a, b and 102a, b of each length-adjusting section are pivoted along the directions 112 indicated in FIG. 3, this causes each section to shift to its extended position 114 shown in FIG. 2. At the same time, the respective linking members move to a mutually in-line position 116 as shown in FIG. 6 for the lower pair of linking members 102a, b of the forward length-adjusting section 98a. Alternatively, when the linking members of each section are pivoted in the directions 118 indicated in FIG. 2 (i.e., when there are no vehicles loathed on the frame), this causes each section to move back to its retracted position 120 shown in FIG. 3. At the same time, the respective linking members move to a collapsed position 122 adjacent each other as shown in FIG. 7 for the upper linking members 100a, b of the forward length-adjusting section 98a. This type of pivoting action makes each length-adjusting section relatively immune to jamming of the type that is prone to occur, for example, between long telescoping members. Nor is it necessary in achieving such pivoting action to enlarge either the upper rail 50a or the lower rail 50b in order to expand their bearing surfaces and prevent cracking. This, in turn, permits the adjustable frame 20 to be made of a relatively lightweight railing and allows a number of such frames to be safely transported, in their collapsed condition, in a single transport container.

Figure 5:
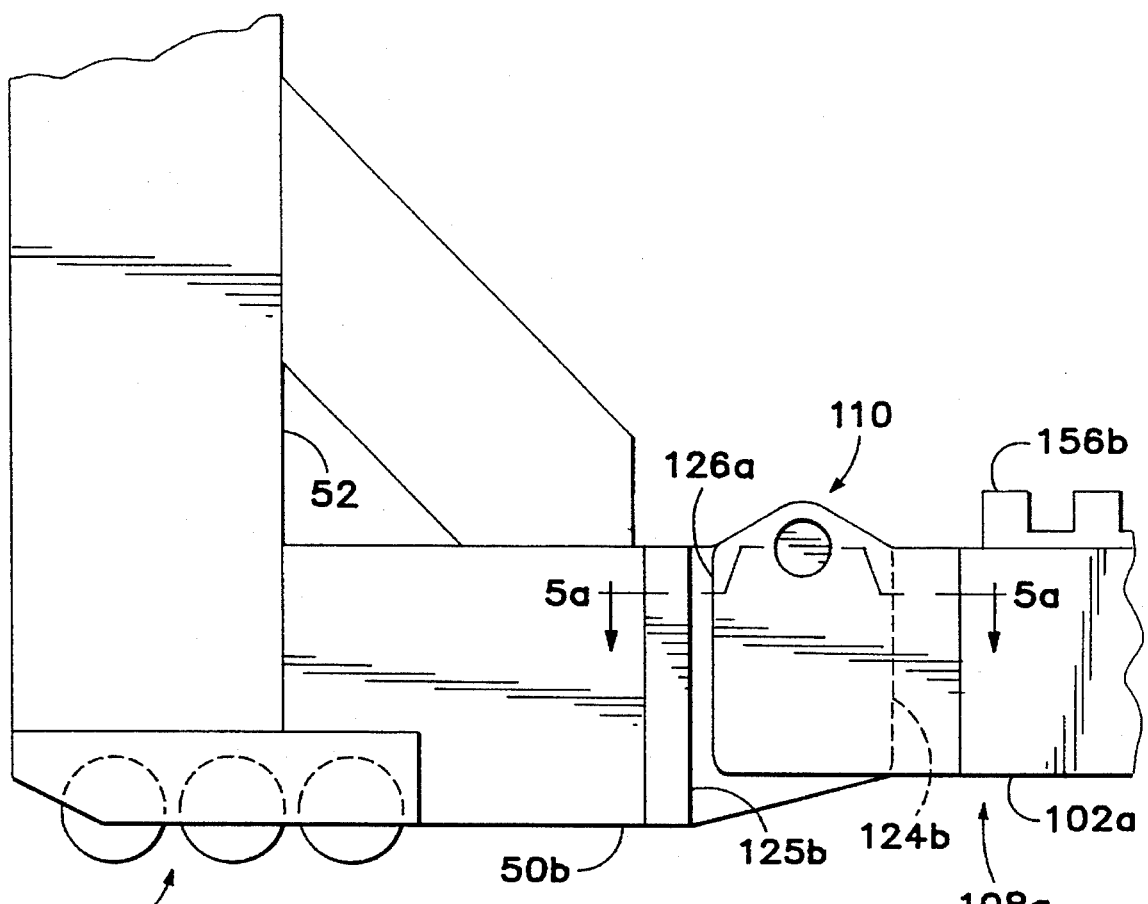
FIG. 5 is a fragmentary side elevational view of an end hinge assembly included on the lower part of the forward length-adjusting section of the frame of FIG. 1 taken after the section has been moved to its extended position.
Figure 5A:
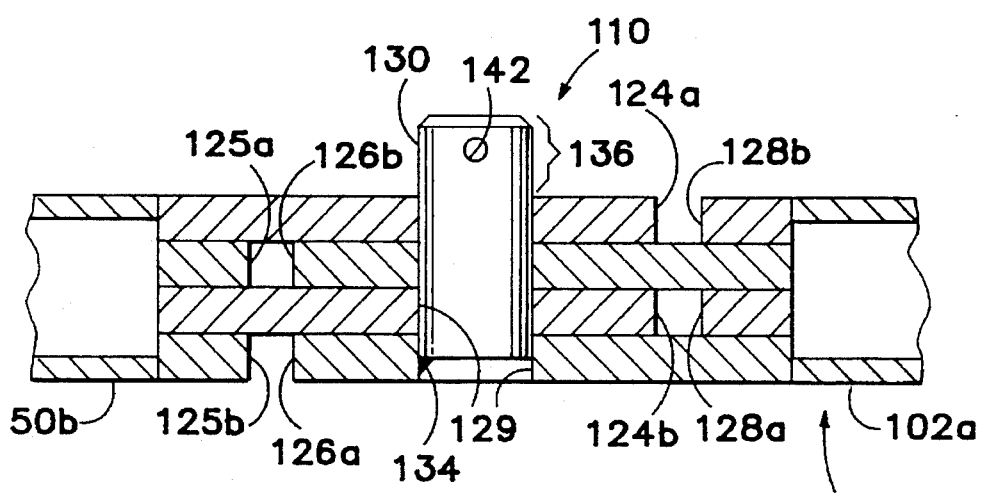
FIG. 5a is a sectional view taken along lines 5a—5a in FIG. 5.

FIGS. 5 and 5a show a representative end hinge assembly 110 connecting one of the lower linking members 102a to a lower rail 50b on the forward end 44 of the frame. In the preferred embodiment shown, the end hinge assembly includes a first pair of hinge plates 124a, b and spacers 25a, b that are welded together in an alternating plate/spacer sequence so that the plates 124a, b are separated by a first one of the spacers 125a and share a common edge with each other and with both spacers. This subassembly is welded to the open end of the lower rail 50b, in which position the second one of the spacers 125b serves to cap off the open end, thereby preventing moisture from collecting inside the hollow steel tubing forming the lower rail. The end hinge assembly further includes a second pair of hinge plates 126a, b that are welded to a corresponding second pair of spacers 128a, b in similar construction to that just described for the first pair of plates. The resulting subassembly is welded to the open end of the second end portion 108a of the linking member so that, as before, one of the spacers 128b serves to cap off the open end. The separated first pair of hinge plates and the separated second pair of hinge plates are then interleaved together, as shown in FIG. 5a, and a pivot pin 130 is passed through a hole 129 formed in each plate and welded immovably to one of the pair of plates (e.g., 126a, b) at an inside weld location 134 in order to provide an axis of rotation for the other pair of plates (e.g., 124a, b). A similar arrangement of hinge plates, spacers, and pivot pins are used for the end hinge assemblies 110 connecting the upper linking members 100a, b to the upper rail 50a, as indicated by correspondingly numbered parts in FIGS. 7–8.

Referring to FIG. 5a, the pivot pin 130 of each end hinge assembly 110 is of sufficient length to form a protruding end portion 136 that protrudes inwardly of the frame. Referring to FIG. 7, which is a view from inside the frame of FIG. 1, when the upper linking members 100a, b of a respective section are moved to their adjacent collapsed position 122, the corresponding end hinge assemblies 110 move to positions that are spaced closely together. Accordingly, referring also to FIG. 8, the end hinge assemblies and linking members can be locked in this arrangement by a removable locking bar 138a in which are formed a pair of spaced-apart holes 140. In particular, these holes fit over the protruding end portions 136 of the pins on the end hinge assemblies while these assemblies are spaced closely together. Referring to FIGS. 5a and 8 together, each protruding end portion 136 forms a bore 142 so that after a locking bar is fitted over the end portion, a lynch pin 157 inserted into the bore will maintain the bar in place. A second locking bar 138b (FIG. 3) is similarly used to lock the lower linking members 102a, b of each section in their collapsed position. Referring to FIG. 4, when these bars 138a and 138b are not being used, they can both be suspended, as shown, from the end hinge assembly of an upper linking member.

As indicated above, the spacers and hinge plates of the respective end hinge assemblies 110 cap off the ends of the upper and lower rails and prevent moisture from collecting inside the hollow steel tubing forming each rail. As a further safeguard against rusting, the upper and lower rails are hot dipped, galvanized or coated with inorganic zinc paint.

Figure 6A:
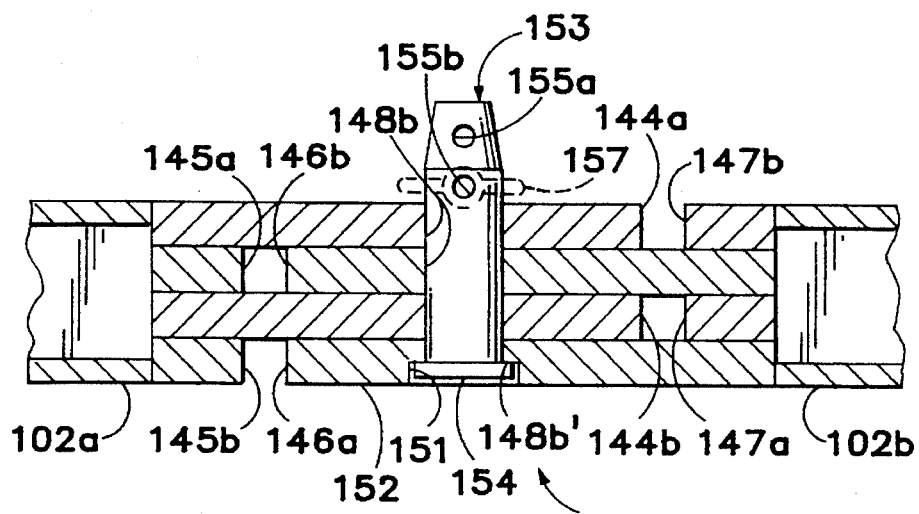
FIG. 6a is a sectional view taken along lines 6a—6a in FIG. 6.
Figure 6B:
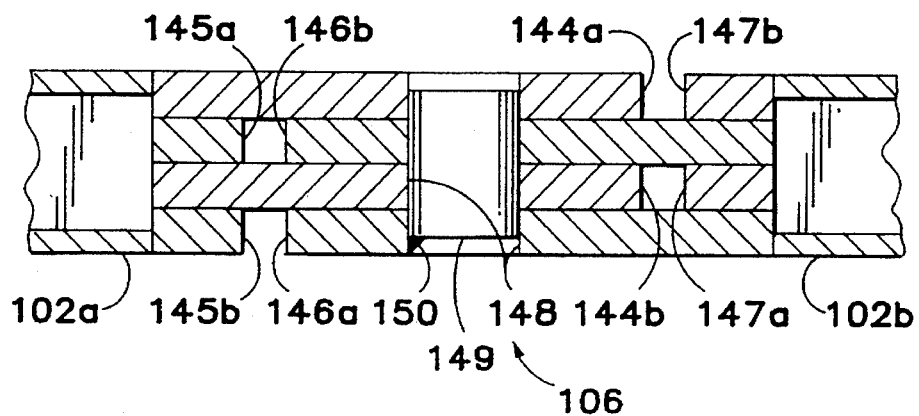
FIG. 6b is a sectional view taken along lines 6b—6b in FIG. 6.

FIGS. 6–6b show different views of a representative center hinge assembly 106 connecting a pair of linking members 102a, b. This center hinge assembly, like the end hinge assemblies described above, includes a first pair of hinge plates 144a, b, which are connected, together with corresponding spacers 145a, b, to the left linking member 102a. This first pair of hinge plates are interleaved with a second pair of hinge plates 146a, b which are connected, together with corresponding spacers 147a, b, to the right linking member 102b. Formed in each hinge plate are a pair of vertically spaced-apart holes 148a, b where a first one of the holes 148a is a constant-diameter hole through which is passed a permanent pivot pin 149. This pivot pin is welded immovably at an inside weld location 150 to one of the pair of hinge plates, as shown in sectional view in FIG. 6b, in order to provide an axis of rotation for the other pair of hinge plates.

The second hole 148b that is formed in each hinge plate is also of constant-diameter thickness, except for that plate (e.g., 146a) which faces outwardly of the frame. In this outward-facing plate, as shown in sectional view in FIG. 6a, the second hole 148b' is modified to form an enlarged cavity region 151 adjacent the outward-facing surface 152 of the plate. Referring to FIGS. 6 and 6a together, after a particular pair of linking members 102a, b have been moved to their in-line position 116 shown, these members can be locked in that position by passing a removable locking pin 153, shown in dashed outline in FIG. 6, through the second hole 148b or 148b' in each hinge plate. The locking pin includes, at one end, an enlarged head 154 which seats within the enlarged cavity region 151 of the modified second hole 148b' without creating any obstruction along the outward-facing surface 152 of the outward-facing plate, which type of obstruction might otherwise mar the sides of the container into which the frame is loaded.

Referring to FIG. 6a, opposite its head end, the locking pin 153 forms a pair of longitudinally-spaced holes 155a, b, both of which are suitably sized to receive the shaft of a lynch pin 157. In order to hold the locking pin 153 in place between the hinge plates 144a, b and 146a, b, the lynch pin is latched onto the locking pin by flipping the securing ring on the lynch pin down over the end of the locking pin in the manner shown in FIGS. 7. The shaft of the lynch pin is passed either through the hole 155a nearest the end of the pin or the hole 155b farthest from the end depending on whether the hinge plates are those interconnecting a lower pair of linking members 102a, b or an upper pair of linking members 100a, b, respectively (i.e., the latter plates, and their corresponding spacers, are somewhat thicker across than the former, but are otherwise generally similar in construction). Referring to FIG. 7, when the locking pin 153 is not in use, that is, when the linking members (e.g., 100a, b) have been moved to their collapsed position 122, the locking pin can be latched, as shown, inside the pair of unused second holes 148b or 148b' of one or the other of the connected pair of hinge plates 144a–b or 146a–b until it is needed again.

Referring to FIG. 4, a broad-sided toothed plate 156a is butt-welded along the broad edge of each upper linking member 100a–b and a narrow-sided tooth plate 156b is end-welded along the narrow edge of each lower linking member 102a–b. These toothed plates define, between each adjacent pair of their respective teeth, a plurality of longitudinally spaced secondary locking positions 158. When a pair of linking members are moved to their extended position 114 extending generally longitudinally of a respective side 42a, b, these secondary locking positions are in longitudinal alignment with the primary locking positions 88 provided on each center section 48. Accordingly, each vertical post 64 can be locked either to a center section via one of the primary locking positions or, alternatively, to a length-adjusting section 98a or 98b via one of the secondary locking positions. The significance of this feature is described further hereinbelow.

Each length-adjusting section 98a, b is movable from its extended position 114 (FIG. 2) extending generally longitudinally of a respective side to its retracted position 120 (FIG. 3) extending generally transverse to the extended position. In particular, each hinged section, in its retracted position, extends generally vertically between the upper and lower rails 50a and 50b. This ensures that each retracted section is kept out-of-the-way so that it neither interferes with the movement of a frame 20 into an enclosure nor with the movement of vehicles into the frame.

As each length-adjusting section 98a, b is moved from its retracted position 120 (FIG. 3) to its extended position 114 (FIG. 2), the end and center pivot pins 130 and 149 of each section resolve any forces that would tend to pull the linking members 100a, b or 102a, b of that section any further apart so that no further movement beyond the extended position is possible. Similarly, during the reverse operation, as the respective sections are moved from their extended position shown in FIG. 2 to their retracted position shown in FIG. 3, the respective lower linking members 102a–b, and their corresponding end hinge plates 126a–b and spacers 128a–b, together with similar end hinge plates and spacers that correspond to the respective upper linking members 100a–b, interferingly come together so that no further movement beyond the retracted position is possible. The particular construction of each section, accordingly, prevents overtravel-type movement in the section, since after movement has started in a section, this movement will automatically stop when either the extended position 114 or the retracted position 120 is reached. There is no need, in particular, to move each section back-and-forth in order to locate the exact position of a particular length setting.

Because of the overtravel limiting capability of its component sections, the length-adjustment assembly 30 is particularly well-suited for adjustment procedures in which automated equipment is used to make the desired adjustments. For example, when it is desired to adjust the length of the frame from its shortest-length setting 160a of 39 feet (FIG. 3) to its longest-length setting 160c of 47 feet (FIG. 2), this adjustment can be accomplished by unlocking each respective length-adjusting section 98a, b (i.e., by removing each locking bar 138a, b) and by pulling the forward and rearward ends 44 and 46 apart using power-driven equipment. There is no possibility that the power-driven equipment will overshoot the intended setting because when the respective sections 98a, b reach their extended positions 114 (FIG. 2) further extension is automatically prevented. If, on the other hand, it is desired to adjust the length of the frame from its shortest-length setting 160a of 39 feet (FIG. 3) to its intermediate length setting 160b of 44 feet (FIG. 1), this can be accomplished by unlocking only the rearward length-adjusting section 98b while keeping the forward length-adjusting section 98a locked (i.e., with its locking bars in place) and by then pulling apart the frame's forward and rearward ends 44 and 46 using power-driven equipment. Again, there is no possibility that the power-driven equipment will overshoot the intended setting because when the rearward length-adjusting section 98b reaches its extended position further extension is automatically prevented.

The two examples of length adjustment just described illustrate how the limited adjustability of each section 98a, b, together with the ability to selectively combine the operations of a plurality of sections in achieving a single adjustment serve to simplify the adjustment process itself and, in consequence, permit automated procedures to be used. At the same time, the use of more than one section, each independently lockable, enables adjustment of the length-adjusting assembly 30 between several different length settings, even though each separate section is limited to only a pair of alternate length positions.

The automated length adjustments which have been described can, of course, be performed in reverse. For example, to adjust the frame length from its longest-length setting 160c of 47 feet (FIG. 2) to its intermediate length setting 160b of 44 feet (FIG. 1), the rearward length-adjusting section 98b is locked in its extended position (i.e., using the removable locking pin 153 shown in FIG. 6a), the forward length-adjusting section 98a is unlocked, and the frame's forward and rearward ends 44 and 46 are pulled together using the power-driven equipment. There is no possibility that the power-driven equipment will overshoot the intended setting because when the forward length-adjusting section 98a reaches its retracted position 120 (FIG. 1) further retraction is automatically prevented.

During machine-assisted adjustment of the length-adjusting assembly 30, there is no opportunity for the respective ends 44 and 46 and the center section 48 of the frame to detach from each other and present a falling hazard. This is so because a permanent connection is established between these ends and the center section by the center hinge assemblies 106 (FIG. 6) and the end hinge assemblies 110 (FIG. 5) which are part of each length-adjusting section 98a, b.

Referring to FIGS. 1–3 together, with regard to the particular length settings of the adjustable frame 20, the difference in length between the intermediate length setting 160b of 44 feet and the shortest-length setting 160a of 39 feet is larger than the difference in length between the longest-length setting 160c of 47 feet and the intermediate length setting of 44 feet. Referring particularly to FIG. 3, this result is achieved by using relatively longer 2 ½-foot linking members 100a– b, 102a–b in the rearward length-adjusting section 98b and relatively shorter 1 ½-foot members on the forward length-adjusting section 98a. In conformance with this setup, the length of the rearward section in its extended position 114 (FIG. 2) is longer than the length of the forward section in its extended position. Accordingly, the rearward section provides greater extensibility or longitudinal adjustability for the shift from 39 feet to 44 feet then is provided by the forward section for the shift from 44 feet to 48 feet.

Referring to FIG. 1, each vehicle-loading zone 38a, b, c includes an adjustable length dimension 94a, b, c. As described above, these length dimensions have maximum limits which sum together to a characteristic value. In particular, this summed value provides a useful measure of the lengthwise vehicle-carrying capacity of the frame or frame portion that the zones occupy. For example, zones 94b and 94c in FIG. 1 occupy a frame portion of equal length 96 to that which is occupied by zones 94f and 94g in FIG. 2 and the summed value of their maximum lengthwise limits, accordingly, are also about equal (i.e., 94b+94c about equals 94f+97g). It will be recognized that this summed value will increase when the length adjusting assembly 30 is used to expand the length of the frame. As a result, for example, of the expansion in frame length which occurs between FIGS. 1 and 2, the summed value increases from 94a+94b+94c to 94d+94e+94f+94g. The gain in lengthwise vehicle-carrying capacity signified by this increase enables the length-adjusted frame in FIG. 2 to carry an added vehicle (e.g., 22e) in addition to its original allotment of vehicles (e.g., 22d, f, g). The lengthwise vehicle-carrying capacity of the lower tier 24b of the frame is likewise increased.

Referring to FIG. 4, in order to bring about the desired increase in the lengthwise vehicle-carrying capacity of the frame, each length-adjusting section 98a, b, when moved to its extended position 114, automatically (i.e., without any further adjustments required) provides a plurality of secondary locking positions 158 that are in longitudinal alignment with the primary locking positions 88 on the center section of the frame. This permits each vertical post 64 to have full mobility of travel over both the center section and each length-adjusting section so that full advantage can be made of the frame's increased length.

The Exemplary Width-Adjusting Assembly

The interconnecting end assembly 54 connected across the forward ends 44 of the adjustable frame 20 includes a width-adjusting assembly 32. This width-adjusting assembly enables selective adjustment of the transverse spacing 62 between the respective sides 42a, b of the frame. For example, the transverse spacing can be adjusted to either a narrower-width setting 62a of about 90 inches (FIG. 11b) or a wider-width setting 62b of about 96 inches (FIG. 11c) depending, for example, on whether the frame is being prepared for loading into an enclosure 26a of narrower transverse interior width 200a or an enclosure 26b of wider transverse interior width 200b.

Referring to FIGS. 11b–c, the width-adjusting assembly 32 is capable of accommodating the several types of adjustment just described while it maintains the end assembly 54 in perpendicular relationship to each of the sides 42a, b (the perpendicular relationship here described is that which the end assembly has with the longitudinal extent of the sides). This ensures that no diminishment in the lengthwise vehicle-carrying capacity of the frame occurs. Referring to FIG. 4, the width-adjusting assembly further includes guiding structure, as described immediately below, that guides the movement of the sides during adjustment of the transverse spacing so that the sides are maintained in substantially upright position throughout such movement. Not only, then, do the sides expand transversely in such a manner as to fully occupy each box-like enclosure, but also the operator or his assistants are free to release the sides at any time during the adjustment procedure without any risk of incurring injury due to falling of the sides.

Referring to FIG. 4, the width-adjusting assembly 32 includes a plurality of width-adjustable joints 204. In the exemplary width-adjusting assembly shown, these joints are telescopically adjustable. In particular, referring also to FIG. 9, each joint includes a centermost sliding member 206a and an edgemost sliding member 206b. Each joint can be set to a pair of alternate width positions (i.e., retracted or extended) by means of a screw jack movement control 208, the construction and operation of which is described in further detail below. In the exemplary embodiment depicted, each edgemost sliding member 206b is a short-chambered hollow rectangular rail that is hingeably connected, by its outside end, to a respective side 42a, b of the frame (i.e., by a hinge 210). As shown, each centermost sliding member 206a is also a hollow rectangular-sided rail. Other forms of telescopically-adjustable sliding members can be used, however, such as those which are U-shaped or semicircular. Moreover, other types of joints, such as hinged joints, can optionally be used in the width-adjusting assembly. It is envisioned that such joints would be generally patterned after those used in the length-adjusting assembly 30 (FIG. 3). Whether telescoping joints or hinged joints are used, however, preferably these joints will guide the movement of the sides as they are being adjusted so that the sides are maintained in perpendicular relationship to the end assembly.

Figure 9A:
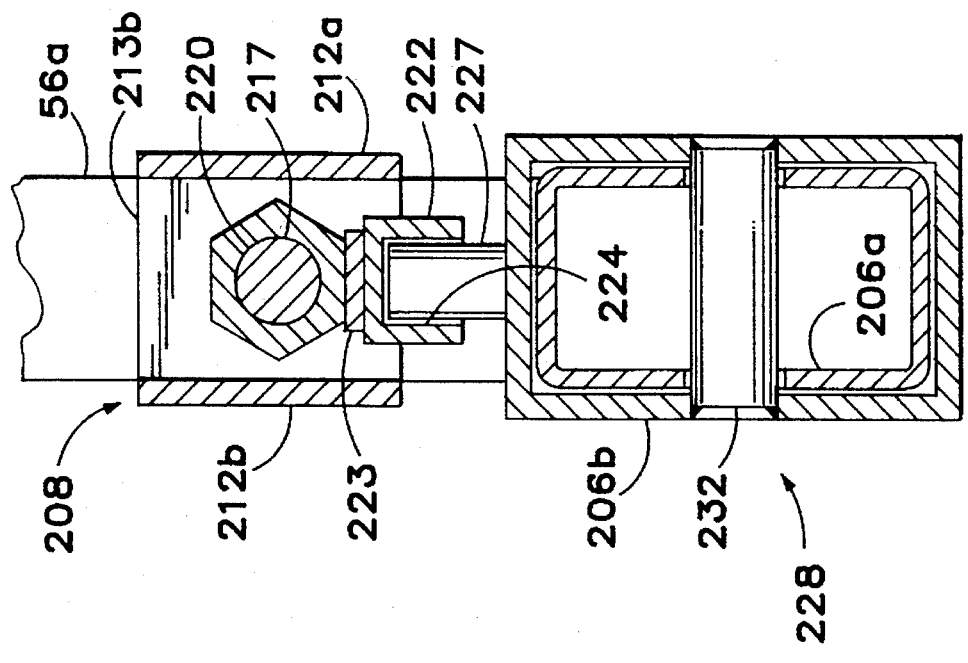
FIG. 9a is a sectional view taken along lines 9a—9a in FIG. 9.
Figure 9:
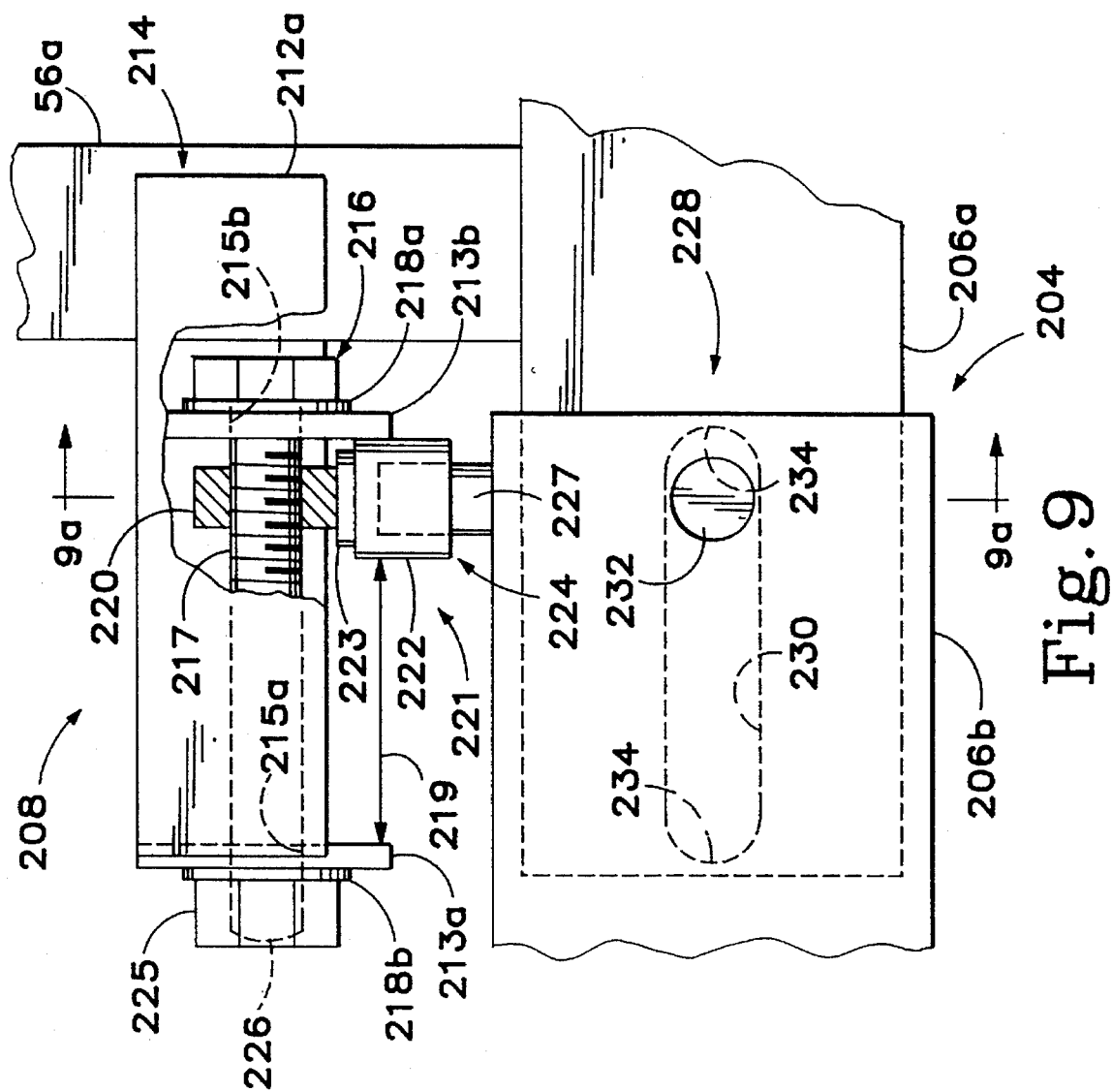
FIG. 9 is a fragmentary side elevational view showing details of an exemplary screw jack movement control of the type included on the width-adjusting assembly shown in FIG. 4.

Referring to FIGS. 9 and 9a, operating in conjunction with each width-adjusting joint 204 is an exemplary screw jack movement control 208 that facilitates machine-driven movement of the joint between its alternative width positions. This control includes a four-sided housing constructed from two long side plates 212a, b which are joined across their faces by two shorter end plates 213a, b. One of the end plates 213a joins the side plates adjacent their respective ends and the other of the end plates 213b joins the side plates some distance from their respective ends so as to form, in the housing, a U-shaped mouth 214. A hole 215a and 215b is drilled in the end plates 213a and 213b, respectively, so that an elongate screw 216, which is threaded over nearly its entire shaft 217, can be inserted through and freely rotate within each hole. Prior to insertion of the screw into hole 215b, a washer 218a is slipped over the screw shaft 217, while subsequent insertion of the screw into hole 215a is preceded by the step of threading an internal hex nut 220, which is part of a traveling coupler assembly 221, onto the screw shaft. The traveling coupler assembly, opposite its internal hex nut 220, includes a short hollow tube 222 which is permanently closed off, at one end, by a plate 223 in order to form a socket 224, and the plate, in turn, is welded to an edge of the internal hex nut 220. A second washer 218b and an external hex nut 225 are applied to the protruding end of the screw shaft, as shown, and the external hex nut is tightened sufficiently so that after this hex nut has been welded to the end of the screw shaft, at weld location 226, the screw 216 is able to turn without any looseness relative to its longitudinal positional whenever a light torque is applied to the external hex nut.

In order to control relative movement between the centermost sliding member 206a and the edgemost sliding member 206b of each width-adjusting joint, the corresponding screw jack movement control 208 must first be properly attached to these members. This is done by holding the screw jack movement control so that the particular leg of the end panel 56a–b which is connected to the centermost sliding member nearest to the edgemost sliding member is received within the U-shaped mouth 214 of the movement control. The external hex nut 225 is then turned until the internal hex nut 220 has been brought to a position in which the socket 224 opposite this nut is aligned with a pin 227 that has been welded to the narrow edge of the edgemost sliding member. The movement control is then shifted toward the edgemost sliding member to catch the pin within the socket as shown in FIG. 9. With the pin now coupled to the socket, the portion of the side plates 212a, b which form the U-shaped mouth are welded in place to the leg of the end panel 56a–b, and are thus indirectly attached to the centermost sliding member 206a.

In order to operate each screw jack movement control 208, the drive socket of a pneumatically-powered hand-held impact wrench (not shown) is fitted onto the external hex nut 225 and the impact wrench is switched on. Provided that the proper rotational direction is selected, this causes the internal hex nut 220 to travel along the rotating screw shaft 217, from a predetermined first latching position shown in FIG. 9, for example, to a predetermined second latching position beyond which additional travel is prevented due to interference between the outer surface of the socket 224 and the end plate 213a. The socket, being attached to the internal hex nut, travels in unison with the nut, so that the pin 227 and lower leg of the end panel 56a or 56b, and hence the edgemost sliding member 206b and centermost sliding member 206a, are forced apart to their extended width position shown in FIG. 4. Alternatively, by setting the rotation of the impact wrench for the opposite direction, the internal hex nut and socket can be driven, by the wrench, back to the predetermined first latching position, beyond which no further travel can occur due to interference between the outer surface of the socket 224 and the end plate 213b. In response, the edgemost sliding member 206b and centermost sliding member 206a are drawn together to their retracted width position shown in FIG. 9.

In accordance with such adjustments, then, it is possible to shift the frame's side-to-side spacing between its narrower-width setting 62a of about 90 inches (FIG. 11b) and its wider-width setting 62b of about 96 inches (FIG. 11c). This is so because each screw jack movement control 208 has a full range of movement 219 (FIG. 9) of three inches so that a full range adjustment of both of the pairs of movement controls on either side 42a, b of the frame (FIG. 4) produces a six inch displacement in frame width. Referring to FIG. 9, there is sufficient looseness of connection provided between the socket 224 and the pin 227, and between the centermost sliding member 206a and the edgemost sliding member 206b (i.e., because of normal manufacturing tolerances), to enable the edgemost sliding member to achieve a slight degree of tilt relative to the centermost sliding member. This, in turn, enables the individual controls that form the pair of movement controls on a particular side of the frame to be adjusted separately of each other in convenient one-by-one sequence using a single impact wrench.

Figure 12:
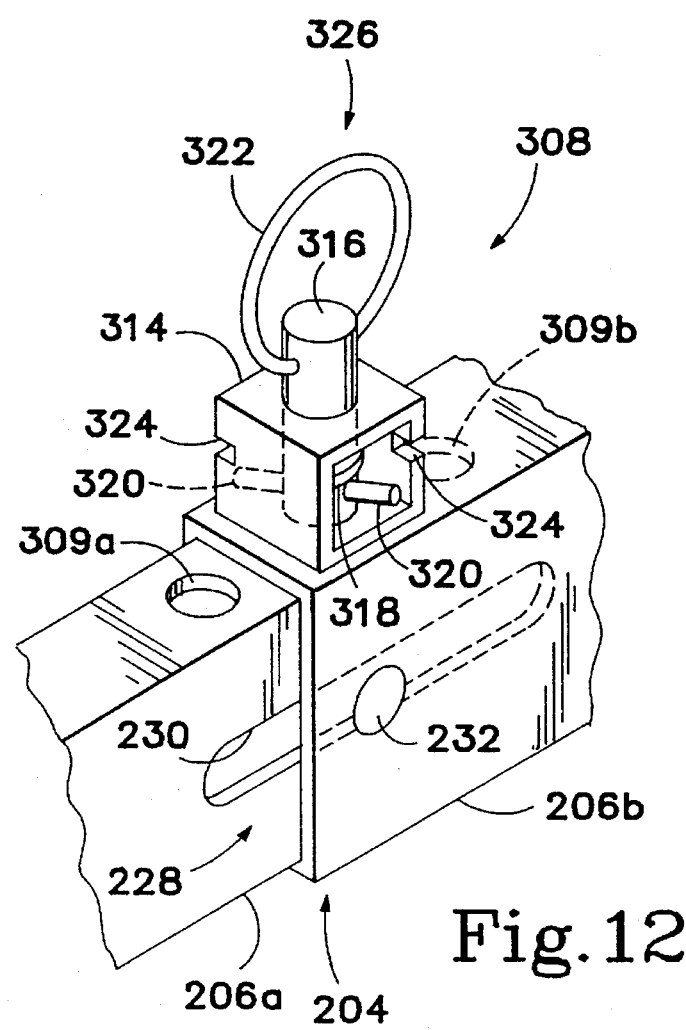

In FIG. 12, an alternative spring-loaded movement-limiting control 308 is shown. This movement-limiting control substitutes for, but does not perform all the functions of, the screw jack movement control 208 described above. Like the screw jack movement control, the spring-loaded movement-limiting control enables each joint to be set to a pair of alternate positions (retracted or extended) due to its latching interaction with a pair of transversely-spaced locking holes 309a, b which are formed, for this purpose, in the centermost sliding member 206a (i.e., at a three inch center-to-center spacing to provide a six inch displacement in frame width). However, the procedure required to adjust this alternative control is somewhat more involved and, if performed automatically, requires somewhat heavier machinery than that required to adjust the screw jack movement control, as will be described in greater detail below.

Referring to FIG. 12, the spring-loaded movement-limiting control 308 includes a rectangular-sided catch 314. Holes are formed in the upper and lower surfaces of the catch to receive a pin 316, which pin is biased for downward movement by a coiled spring 318 interposed between an interior upper surface of the catch and an opposite pair of peg arms 320 which laterally project from the pin. To disable the movement-limiting control, the operator pulls upwardly on the handle or ring 322 that is swivably attached to the upper end of the pin while, at the same time, rotating the pin about its lengthwise axis so that the peg arms are caught between a pair of slots 324 that are formed in the catch 314 for this purpose. Alternatively, to set the movement-limiting control to its ready position 326 shown in FIG. 12, the arms 320 are rotated out of the slots 324 and the pins let down so that its lower end abuts slidably against the upper surface of the centermost sliding member 206a after first passing through a hole in the lower surface of the catch and a second hole (not visible) formed in the upper surface of the edgemost sliding member 206b.

If the movement-limiting control 308 of FIG. 12 is substituted for the exemplary control 208 shown in FIG. 4, when the movement-limiting controls along a particular side 42a or 42b of the frame are set to their ready positions 326, that particular side is then free to move relative to each end panel 56a or b. Depending on the direction in which the side is moved, the pin 316 of each movement-limiting control eventually comes into alignment with one or the other of the pair of alternate locking holes 309a, b provided on the corresponding centermost sliding member 206a. When this occurs, the spring of the movement-limiting control drives the pin into the locking hole so that further movement between the side and the corresponding end panel is prevented. Each movement-limiting control 308, accordingly, has the capability to automatically lock its adjacent side immovably to the end assembly 54 when movement between that side and the corresponding end panel brings the side and panel into a predetermined relative position (i.e., where the pin is aligned with one or the other of the locking holes).

As with the exemplary control 208, the locking procedure for the alternative spring-loaded movement-limiting control 308 can be performed with the assistance of power-driven equipment, provided a two-step shifting process is used. For example, in order to shift the side-to-side frame spacing from its wider-width setting 62b of about 96 inches (FIG. 11c) to its narrower-width setting 62a of about 90 inches (FIG. 11b), firmly mounted machinery that is capable of gripping the sides and drawing them together is engaged to the frame. Each movement-limiting control is disabled, in the manner described above, and the machinery is operated momentarily so that both sides 42a, b are shifted a short distance toward the end assembly. The actual distance covered during this first shift is not critical provided that each side moves a sufficient distance to permit each movement-limiting control to be set to its ready position 326 shown in FIG. 12. After the movement-limiting controls have again been set to their respective ready positions, the machinery is again operated so that the sides 42a, b are shifted a second time toward the end panels. This shifting continues until each joint 204 locks automatically in its retracted position. During this second shifting step, there is no possibility that the machinery will overshoot the intended setting because when the joints reach their retracted positions no further movement along these joints is possible. The procedure for shifting the end assembly from its narrower-width setting 62a (FIG. 11b) to its wider-width setting 62b (FIG. 11c) is similarly achieved except that the above movements are reversed.

Regardless of which type of control, the exemplary screw-jack movement control 208 or the spring-loaded movement-limiting control 308, is used in the width-adjusting assembly 34, and regardless of whether the width is being adjusted to its wider-width setting or to its narrower-width setting, the centered position of the central hinge assembly 58 can be preserved. This capability for balanced adjustment is made possible by the pair of predetermined width positions (i.e., retracted or extended) that each adjustable joint 204 (FIGS. 9 and 12) provides in conjunction with the corresponding control, which enables equal shift between each side 42a, b and its corresponding end panel 56a, b during each type of adjustment. Regardless, then, of whether a narrower- or wider-width setting has been selected, after the frame is finally unloaded and is ready for reshipment, the end assembly 54 is able to fold inwardly of the frame to its collapsed position 60 (FIG. 11a) without requiring any further adjustment between these two settings.

When the end assembly 54 is folded inwardly of the frame to its collapsed position 60 shown in FIG. 11a, the width-adjusting assembly 32 in effect "remembers" its previous setting so that when the end assembly is opened again, the width-adjusting assembly will return to that setting. Foe example, if the width-adjusting assembly is locked in its widest-width setting 62b (FIG. 11c) prior to collapse of the end assembly, when the end assembly is again opened, this widest-width setting will be restored. This capability of the width-adjusting assembly for maintaining its adjustment substantially constant despite the foldable movement of the end assembly produces savings in time and manpower by making the frequency of frame readjustment independent of the frequency of frame reuse.

Referring to FIGS. 9, 9a and 12, each adjustable joint 204, in addition to functionally interacting with, a screw jack movement control 208 or, alternatively, a spring-loaded movement-limiting control 308, further includes a stop mechanism 228. This stop mechanism provides additional protection against movement of the sides 42a, b of the frame away from each other after the transverse spacing 62 between the sides has reached a predetermined maximum limit. This stop mechanism includes an elongate slot 230 which is formed along one side of each centermost sliding member 206a and which extends a short distance beyond either latching position respectively defined by the end plates 213a, b (FIG. 9) or the locking holes 309a, b (FIG. 12) which are fixed in position relative to the same member. The stop mechanism 228 further includes a cross-pin 232 (FIG. 9a) which is passed between a pair of holes formed in the end of the edgemost sliding member 206b so as to link with the slot 230 formed in the centermost sliding member. The cross-pin is immovably welded to the sliding member in this linking position. Accordingly, even if a control is disabled and is able to travel past its normal latching positions (absent misuse and severe physical damage, this is unlikely for the particular control 208), the corresponding joint 204 will move little beyond its retracted position or extended position because of interference between the cross-pin and one or the other end 234 of the slot 230. Referring also to FIG. 4, this stop mechanism ensures that the end assembly 54 permanently connects together the sides 42a, b of the frame so that any falling hazard that might otherwise possibly occur during the width-adjusting process because of overly careless procedure is eliminated.

The Exemplary Adapter Assembly

Figure 10:
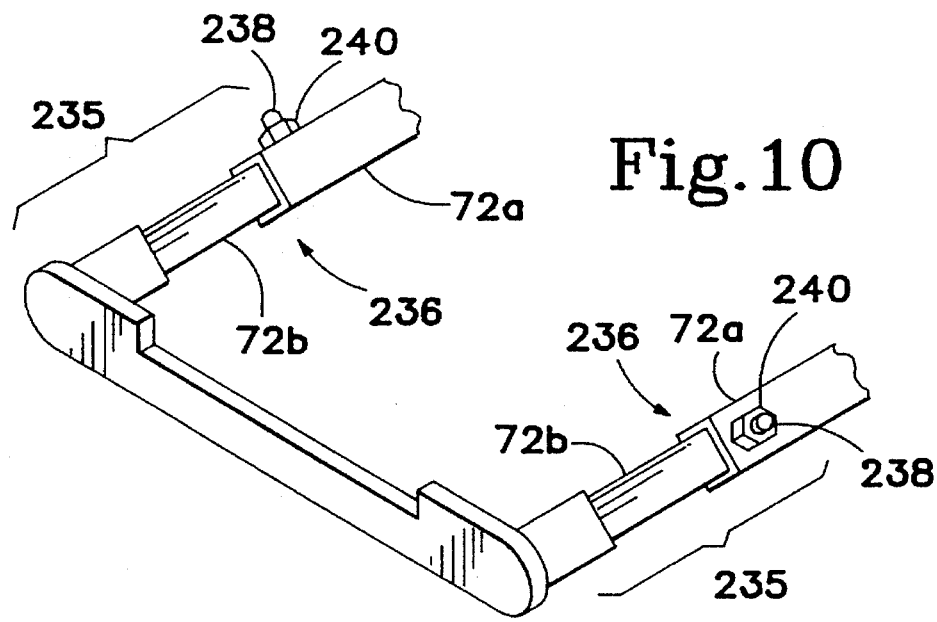
FIG. 10 is a fragmentary perspective view showing an adapter which, as indicated in FIG. 4, is included at each respective end of each wheel cradle support of the frame of FIG. 1.

Referring to FIG. 4, the vehicle-supporting assembly 36 of the frame 20 includes an adapter assembly 40. This adapter assembly enables adjustment of each elongate wheel cradle support 66 so that each wheel cradle support can continue to connect to the respective sides 42a, b of the frame despite adjustment of the transverse spacing 62 between these sides. Relative to each wheel cradle support, the adapter assembly preferably includes a pair of adjustable portions 235 that are respectively located on each end of the wheel cradle support. Referring to FIG. 10, each adjustable portion includes a telescoping joint 236 formed by an outside and inside pair of parallel members 72a and 72b, respectively. Use of this type of telescoping interface gives each adjustable portion, regardless of its setting, a streamlined profile so that there is no interference with the pair of wheels 70a, b (FIG. 4) received on each support during vehicle loading. Each of the respective parallel members 72a, b are made of hollow rectangular-sided tubing so that the weight of each wheel cradle support is relatively low.

As shown in FIG. 10, directly adjacent the telescoping joint 236, adjustably attached to each of the outside pair of parallel members 72a, is a setting screw 238. The lower end of the screw passes through a hole formed in each outside member so that when the screw is tightened its lower end abuts against and frictionally grips the underlying inner member. A nut 240 is welded in centered position over the hole formed in each outside member 72a in order to provide screw threads to permit tightening of each setting screw. To further minimize any risk of interference with the tires 70a, b, each setting screw preferably is of the headless or "grub" screw type where a hexagonal bore formed in the screw head permits adjustment of the screw using an Allen wrench.

Referring to FIG. 4, each elongate wheel cradle support 66 can receive the transverse pair of wheels 70a, b of a vehicle when the spacing 76 between the wheels falls within a predetermined range of wheel spacings corresponding to the inner and outer width dimensions 74a and 74b of the wheel cradle support. As shown in FIGS. 11b and 11c, when the transverse spacing 62 between the sides of the frame 20 is increased from its narrower-width setting 62a of about 90 inches to its wider-width setting 62b of about 96 inches, the adapter assembly 40 can be used to increase the outer width dimension limit 74b of the wheel cradle support in proportion to this increase in frame width (e.g., from 74b' about equal to 80 inches to 74b" about equal to 86 inches). At the same time, the inner width dimension limit 74a of the wheel cradle support is maintained substantially constant as shown in FIGS. 11b–c. In other words, for wider settings of the frame, the adapter assembly enables the wheel cradle support not only to support vehicles of exceptionally large tread but also preserves unchanged the wheel cradle support's ability to support vehicles of very small tread. The required adjustments are conveniently performed by loosening the setting screws 238 (FIG. 10) that are adjacent each end of the wheel cradle support, by shiftably adjusting these ends an equal distance away from the support's center section, and by then retightening the setting screws.

Preferred Method of Adjusting the Exemplary Frame

In accordance with a preferred method of adjusting the exemplary frame 20, the size of the frame is adjusted based on criteria that is independent of the relative sizes of the respective vehicles that are to be carried on the frame. In particular, referring to FIG. 4, the transverse spacing 62 between the sides 42a, b of the frame, also referred to herein as the "width" of the frame, is adjusted to conform closely to the transverse interior width of an enclosure selected to hold the frame during transport. Thus, if the enclosure selected has a relatively wider transverse interior width 200b (FIG. 11c), then the width of the frame is adjusted to its wider-width setting 62b of about 96 inches by means of the width-adjusting assembly 32 (FIG. 4). In similar manner, the size of the frame in a directional longitudinal of the frame is adjusted to conform closely to the interior length of the selected enclosure. For example, if the interior length of the enclosure selected is nominally 48 feet in length, then the frame is adjusted to its longest-length setting 160c of 47 feet (FIG. 2) by means of the length-adjusting assembly 30.

In order to adjust the width of the frame from its narrow-width setting 62a (FIG. 11b) to its wider-width setting 62b (FIG. 11c) for example, it is only necessary to use a single impact wrench to successively turn each screw jack movement control 208 (FIG. 4) in such a direction as will force the sides 42a, b of the frame apart. The precise duration of time that the impact wrench is operative while coupled to each control 208 is not critical because once each width-adjusting joint 204 reaches its extended position, no further movement beyond this position is possible. Similarly, in order to adjust the length of the frame from its shortest-length setting 160a (FIG. 3) to its longest-length setting 160c (FIG. 2), it is only necessary to unlock each of the forward and rearward length-adjusting sections 98a, b and to draw the forward and rearward ends 44 and 46 of the frame apart by operation of suitable force-applying machinery until both sections automatically stop, each in its extended position. No further movement is possible for either section beyond this position, and the operator can prevent reversal of either section from this position by locking each of the forward and rearward sections with the removable locking pin 153 shown in FIG. 6a.

Referring to FIG. 4, the process of adjusting the vehicle-supporting assembly 36 preferably is not completed until after the process of adjusting the size of the frame is completed. In a general sense, then, the exemplary method is composed of two distinct parts. The first part encompasses adjustment of the overall size of the frame to ensure that the frame will fit snugly within the enclosure selected. The second part encompasses completion of adjustment of the vehicle-supporting assembly to ensure that this assembly will support the vehicles requiring transport with minimal restrictions imposed on vehicle size and in the most space-conserving manner possible. This two-part adjustment method facilitates maximum utilization of the interior space within the enclosure because after the vehicle-carrying capacity of the frame is adjusted for taking full advantage of this space, it is then readily evident, based on study of the frame alone, just exactly what sizes of vehicles need to be loaded on the frame in order to most completely occupy the enclosure's interior space. This method also eliminates the need to reset all the adjustable parts on the frame whenever changes occur in the sizes of the vehicles retiring transport. The parts that adjust frame size (i.e., the length-adjusting assembly 30 and the width-adjusting assembly 32) only require readjustment if the size of the enclosure changes. As further described below, although certain parts on the vehicle-supporting assembly 36 will require readjustment if the sizes of the vehicles change, these parts are easily set using shifting-type adjustments.

Referring to FIG. 4, one component aspect of adjusting the vehicle-supporting assembly 36 is to adjust the length of each wheel cradle support 66 so that the respective ends of each support reach to the hangers 68 which connect that support to the sides of the frame (e.g., to compensate for a change in frame width 62). Referring to FIG. 10, this is done by loosening the setting screws 238 that lock each adjusting portion 235 and by shifting each end of the wheel cradle support away from the corresponding joints 236 until these ends are in a position that reaches the hangers. Referring to FIG. 11c, this shifting preferably is done so that the adjustable portions extend out equally in order to keep the wheel cradle support centered relative to the sides 42a, b of the frame for maximum vehicle-to-frame clearance. As shown in FIG. 11c, it is not necessary that each support be adjusted to a different length but rather the outer width dimension limits 74b of the respective supports are maintained substantially uniform relative to each other. This makes it possible to adjust only one wheel cradle support on-frame and then to use that support off-frame as a model by which to efficiently adjust the remaining wheel cradle supports. Alternatively, each elongate wheel cradle support can be provided with longitudinally-spaced markings to delineate the appropriate settings for each adjustable portion.

Referring to FIG. 4, the inner width dimension limit 74a of each wheel cradle support is purposefully selected so that no vehicle that conceivably might be carried on the support will have a transverse wheel spacing 76 too narrow for the support. As a practical matter, then, a particular vehicle can be carried on a particular wheel cradle support provided that the vehicle's transverse wheel spacing does not exceed the outer width dimension limit 74b of the support. Even at its narrower setting, however, the outer-width dimension limit 74b is sufficiently large that it is unlikely that the transverse wheel spacing 76 of a particular vehicle will exceed this limit, although conceivably an exceptionally wide vehicle may require that an adjustment be made to the wider-width setting that each support provides. Accordingly, at least with respect to standard-size vehicles, there is no need to adjust the length of each wheel cradle support to conform to the width of specific vehicles. Instead, when loading such vehicles, the only time adjustments need to be made to each wheel cradle support is when the width 62 of the frame is occasionally changed.

Referring to FIGS. 1 and 4 together, a second component aspect of adjusting the vehicle-supporting assembly 36 is to adjust the relative length dimension (e.g., 94a, b or c) of each respective vehicle-loading zone (e.g., 38a, b or c) so that each zone is ready to receive a particular vehicle. In FIG. 1, for example, if a shorter-length vehicle was chosen to occupy zone 38a instead of vehicle 22a, this is easily accommodated simply by slidably shifting the vertical posts 64 that correspond to zone 38a in order to shorten length dimension 94a.

Preferably, the vehicles requiring transport are grouped in accordance with their combined capability to fully occupy frame space. For example, if the frame has been adjusted to its longest-length setting 160c shown in FIG. 2, and there are two groups of vehicles which optionally can be loaded on the frame, the first group including vehicles 22d, e, f, g as shown and the second group including similar vehicles except that vehicle 22d is replaced by vehicle 22c (FIG. 1), then it is preferable to select the first group over the second because with this first group, as shown, the lengthwise capacity of the frame is more fully utilized.

After adjustment of the vehicle-supporting assembly 36 is completed, vehicles can then be loaded on the adjustable frame 20 in any manner known in the art. Preferably, however, a sled (not shown) is used to expedite the vehicle-loading process, which sled has the capability to move preadjusted wheel cradle supports and selected vehicles en masse into the frame (e.g., through the opening at the frame's rearward end 46. The construction of such a sled and the details of its operation are described in Gearin, U.S. Pat. No. 4,957,407, which is herein incorporated by reference. Referring to FIG. 1, after the upper and lower tiers 24a, b of the frame have been loaded with vehicles, the frame is then loaded into the enclosure 26 that has selected to hold the frame.

Although a preferred embodiment of the adjustable frame 20, and its preferred method of use, have now been described, it will be recognized that alternative forms of the frame and other uses are possible without departing substantially from the broader principles of the present invention. For example, with respect to the length-adjusting assembly 30, a greater or lesser number of length-adjusting sections can be used on each side depending on the number of different length settings desired, and these respective sections may or may not be separated from each other by nonadjustable sections. With respect to the width-adjusting assembly 32, hinged joints may be used although these would not retract with the same compactness as telescoping joints. With respect to the adapter assembly 40, it is possible to mount such an adapter centrally on the wheel cradle support, or even on the hangers, although some impairment in the wheel cradle support's ability to carry vehicles of almost any width can result. With respect to the described procedure for adjusting the frame, provided sufficient manpower is available, it is possible to adjust each component assembly of the frame (e.g., 30, 32 or 40) by manual effort alone (e.g., without the assistance of external power-driven equipment). These examples are only illustrative and are not intended to be exhaustive of the possibilities.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An elongate vehicle-carrying frame comprising:
   (a) a pair of transversely-spaced elongate upright sides capable of supporting a wheeled vehicle;
   (b) an elongate wheel support configured so that a transversely spaced pair of wheels of said vehicle are able to be supported on said wheel support;
   (c) connecting means for connecting said wheel support to said sides in a supporting position extending transversely between said sides;
   (d) a width-adjusting assembly connected to said sides separately structurally from said wheel support and adapted to enable selective adjustment of the transverse spacing between said sides; and
   (e) an adapter configured to selectively compensate for said adjustment so as to enable said wheel support to connect to said sides despite said adjustment.

2. The frame of claim 1 wherein said adapter is included on said wheel support and enables adjustment of the length of said wheel support.

3. The frame of claim 1 wherein said connecting means connects said wheel support to said sides so as to enable said wheel support to be raised and lowered relative to said sides while said wheel support is maintained in said supporting position extending transversely between said sides.

4. The frame of claim 1 wherein said connecting means removably connects said wheel support to said sides.

5. The frame of claim 1 wherein said wheel support is able to support said transversely spaced pair of wheels when the transverse spacing between said wheels falls within a predetermined range of wheel spacings.

6. The frame of claim 1 wherein said sides define the transversely outermost portions of said frame.

7. An elongate vehicle-carrying frame comprising:
   (a) a pair of transversely-spaced elongate upright sides defining the transversely outermost portions of said frame, said sides being configured so that a pair of vehicles are positionable in vertically spaced relationship to each other with the lower one of said vehicles being interposed between said sides and the upper one of said vehicles being supported by said sides;
   (b) an interconnecting assembly interconnecting said sides and extending in generally transverse relationship therebetween; and
   (c) a width-adjusting assembly included on said interconnecting assembly and adapted so as to enable selective adjustment of the transverse spacing between said sides, said interconnecting assembly being mounted in generally transverse relationship between said sides during said adjustment, said sides being guided by said width-adjusting assembly during said adjustment so that each side is maintained in substantially upright position.

8. The frame of claim 7 wherein said width-adjusting assembly includes a stop mechanism adapted to prevent additional movement of said sides away from each other after said transverse spacing has reached a predetermined maximum limit.

9. The frame of claim 7 wherein said interconnecting assembly permanently interconnects said sides.

10. The frame of claim 7 wherein said width-adjusting assembly includes a control mechanism having a screw-operated jack configured so that a respective one of said sides is urgeable into movement in a transverse direction relative to a respective portion of said interconnecting assembly in response to selective actuation of said screw-operated jack and said movement in said transverse direction is resisted by said control mechanism unless initiated by said screw-operated jack.

11. The frame of claim 7 wherein said width-adjusting assembly includes a releasable latching mechanism adapted to immovably engage automatically a respective one of said sides to a respective portion of said interconnecting assembly when adjustment of said width-adjusting assembly brings said respective one of said sides into a predetermined position relative to said respective portion of said interconnecting assembly.

12. The frame of claim 7 wherein said interconnecting assembly is selectively foldable inwardly of said frame from said perpendicular relationship to a collapsed position wherein said interconnecting assembly extends generally parallel to said sides and said sides are shifted to a closely adjacent interconnected position.

13. The frame of claim 7 wherein said width-adjusting assembly includes a control mechanism having a screw-operated jack configured so that a respective one of said sides is urgeable into movement bidirectionally relative to a respective portion of said interconnecting assembly in response to selective actuation of said screw-operated jack.

14. The frame of claim 7 wherein said interconnecting assembly hingeably interconnects said sides.

15. The frame of claim 7 further including a wheel support, said wheel support being movably connected to said sides such that said upper one of said vehicles is moveable vertically relative to said sides while a transversely-spaced pair of wheels of said upper one of said vehicles is supported on said wheel support.

16. The frame of claim 7 wherein said frame is insertable into a protective transport enclosure while loaded with said pair of vehicles.

17. The frame of claim 7 wherein said frame is freestanding.

* * * * *

UNITED STATES PATENT AND TRADEMARK OFFICE
CERTIFICATE OF CORRECTION

PATENT NO. : 5,454,672

DATED : October 3, 1995

INVENTOR(S) : Terence Halpin et al.

It is certified that error appears in the above-indentified patent and that said Letters Patent is hereby corrected as shown below:

Col. 2, line 18  After "sides" insert --.--

Col. 2, line 28  Change "Length" to --length--

Col. 2, line 55  Change "Limited" to --limited--

Col. 3, line 36  Change "hew" to --new--

Col. 4, line 11  Change "Safely" to --safely--

Col. 8, line 59  Change "70ia" to --70a--

Col. 9, line 4   Change "Separate" to --separate--

Col. 10, line 13 After "(e.g., 94a, b, c)" insert --.--

Col. 11, line 14 Change "Upper" to --upper--

Col. 11, line 34 Change "loathed" to --loaded--

Col. 13, line 18 Change "FIGS. 7" to --Fig. 7--

Col. 18, line 44 Change "pins" to --pin--

Col. 19, line 54 Change Foe" to --for--

UNITED STATES PATENT AND TRADEMARK OFFICE
CERTIFICATE OF CORRECTION

PATENT NO. : 5,454,672
DATED : October 3, 1995
INVENTOR(S) : Terence Halpin, et

It is certified that error appears in the above-indentified patent and that said Letters Patent is hereby corrected as shown below:

Col. 21, line 16    Change "by,loosening" to
                    --by loosening--

Signed and Sealed this

Eighteenth Day of June, 1996

Attest:

BRUCE LEHMAN

Attesting Officer    Commissioner of Patents and Trademarks